United States Patent
Sato

(10) Patent No.: US 7,197,343 B2
(45) Date of Patent: Mar. 27, 2007

(54) PORTABLE ELECTRONIC APPARATUS WITH AZIMUTH MEASURING FUNCTION, MAGNETIC SENSOR SUITABLE FOR THE APPARATUS, AND AZIMUTH MEASURING METHOD FOR THE APPARATUS

(75) Inventor: Hideki Sato, Shizuoka-Ken (JP)

(73) Assignee: Yamaha Corporation, Hamamatsu (JP)

( * ) Notice: Subject to any disclaimer, the term of this patent is extended or adjusted under 35 U.S.C. 154(b) by 411 days.

(21) Appl. No.: 10/190,525

(22) Filed: Jul. 9, 2002

(65) Prior Publication Data
US 2003/0013507 A1 Jan. 16, 2003

(30) Foreign Application Priority Data
Jul. 10, 2001 (JP) ............................. 2001-210053
Apr. 17, 2002 (JP) ............................. 2002-115250

(51) Int. Cl.
*H04M 1/00* (2006.01)
(52) U.S. Cl. ............... 455/575.1; 455/90.1; 455/556.1; 342/147; 33/272; 33/315; 33/319; 33/358; 701/224
(58) Field of Classification Search ............ 455/456.1, 455/90.1, 550.1, 889, 556.1; 701/224; 342/147, 342/357.14; 33/272, 315–316, 319, 356–358, 33/355, 359
See application file for complete search history.

(56) References Cited

U.S. PATENT DOCUMENTS

| | | | |
|---|---|---|---|
| 4,698,912 A | 10/1987 | Fowler et al. | |
| 4,720,992 A * | 1/1988 | Hormel | ........................ 73/1.76 |
| 4,739,560 A | 4/1988 | Akutsu et al. | |
| 4,807,462 A | 2/1989 | Al-Attar | |
| 5,561,368 A | 10/1996 | Dovek et al. | |
| 6,009,629 A | 1/2000 | Gnepf et al. | |
| 6,249,246 B1 * | 6/2001 | Bode et al. | ........... 342/357.14 |
| 6,252,395 B1 | 6/2001 | Aoyama et al. | |

FOREIGN PATENT DOCUMENTS

| | | |
|---|---|---|
| JP | 63-193866 | 12/1988 |
| JP | 3-221810 | 9/1991 |
| JP | 3-221811 | 9/1991 |
| JP | 6-58758 | 3/1994 |
| JP | 6-167342 | 6/1994 |
| JP | 7-35553 | 2/1995 |
| JP | 8-5381 | 1/1996 |
| JP | 10-153427 | 6/1998 |

OTHER PUBLICATIONS

Abstract of JP-59-159565.
Abstract of JP-2001-183433.

(Continued)

*Primary Examiner*—George Eng
*Assistant Examiner*—Marcos L Torres
(74) *Attorney, Agent, or Firm*—Dickstein, Shapiro, LLP.

(57) ABSTRACT

A portable phone has a CPU and a magnetic sensor unit including an X-axis magnetic sensor, a Y-axis magnetic sensor, and a temperature sensor. CPU measures at first and second temperatures the influence of a magnetic field of permanent magnets upon an output Sx of the X-axis magnetic sensor and an output Sy of the Y-axis magnetic sensor, and stores the influence data together with the first and second temperature data. CPU estimates at the present temperature the influence upon the output Sx of the X-axis magnetic sensor and the output Sy of the Y-axis magnetic sensor, from the present temperature detected with the temperature sensor and the stored influence data. CPU corrects the outputs Sx and Sy in accordance with the estimated influence and determines the direction of the portable phone from the corrected outputs Sx and Sy.

3 Claims, 19 Drawing Sheets

OTHER PUBLICATIONS

Abstract of JP-06-232478.
Abstract of JP-08-211138.
Kawahito et al., IEEE Journal of Solid-State Circuits, pp. 1843-1844, vol. 34 (1999).
Ryan et al., "ISSCC 92/Session 7/Circuits for Transducers and Active-Matrix LCD Drivers", IEEE International Solid-State Circuits Conference, Session 7, Paper 7.4 (1992).
Copy of European Search Report dated Dec. 30, 2005.

* cited by examiner

PORTABLE ELECTRONIC APPARATUS WITH AZIMUTH MEASURING FUNCTION, MAGNETIC SENSOR SUITABLE FOR THE APPARATUS, AND AZIMUTH MEASURING METHOD FOR THE APPARATUS

CROSS REFERENCE TO RELATED APPLICATION

This application is based on Japanese Patent Application No. 2002-115250, filed on Apr. 17, 2002, the entire contents of which are incorporated herein by reference.

BACKGROUND OF THE INVENTION

A) Field of the Invention

The present invention relates to a portable electronic apparatus having a communication device with permanent magnets and a direction (azimuth) measuring device, to a magnetic sensor unit suitable for the apparatus, and to a direction measuring method for the apparatus.

B) Description of the Related Art

A magnetic sensor unit is known which detects geomagnetism and measures a direction. Recent studies are directed to adding a navigation function to a portable electronic apparatus typically a portable phone having the communication device and the magnetic sensor unit capable of detecting geomagnetism, the communication device including a speaker, a microphone, a transceiver circuit, a display device and the like.

The communication device including a speaker, a microphone, a display device and the like has permanent magnets. The magnetic sensor unit outputs a signal corresponding to the synthesized magnetic field of geomagnetism and a magnetic field of permanent magnets. There arises therefore a problem that the direction determined from the signal output from the magnetic sensor unit is not precise. The magnetic field of a permanent magnet changes with the temperature of the magnet. If the signal of the magnetic sensor unit is corrected only by the influence of the magnetic field of the magnet detected at one temperature on the signal of the magnetic sensor, and the direction is determined from the corrected signal, the determined direction is not correct when the temperature of the magnet changes.

SUMMARY OF THE INVENTION

An object of this invention is to provide a portable electronic apparatus capable of measuring a direction at high precision even if the temperature of permanent magnets changes, and a magnetic sensor unit suitable for the apparatus.

Another object of the invention is to provide a direction measuring method capable of measuring a direction at high precision by estimating the influence of the magnetic field of permanent magnets of the apparatus upon the magnetic sensor unit with simple user operations.

According to one aspect of the present invention, there is provided a portable electronic apparatus comprising: a casing; a communication device accommodated in the casing and having permanent magnets; and a direction measuring device accommodated in the casing for measuring a direction by utilizing geomagnetism, wherein the direction measuring device comprises: magnetic sensors for outputting signals corresponding to an external magnetic field; a temperature sensor for detecting a temperature; a corrector for estimating influence of the magnetic field of the permanent magnets upon the signals output from the magnetic sensors in accordance with the detected temperature, and correcting the signals output from the magnetic sensors in accordance with the estimated influence; and a direction determining device for determining a direction in accordance with the corrected signals. The detected temperature corresponds to the temperature of permanent magnets. Detecting the temperature also includes estimating the temperature.

The influence of the magnetic field of the permanent magnets upon the outputs of the magnetic sensors is estimated from the detected temperature. The outputs of the magnet sensor unit are corrected by the estimated influence. The direction is determined from the corrected outputs of the magnetic sensors. Accordingly the direction can be measured and determined at high precision even if the temperature of the permanent magnets changes and the influence of the magnetic field of the permanent magnets upon the outputs of the magnetic sensor unit changes.

The influence of the magnetic field of the permanent magnets upon the outputs of the magnetic sensors can be estimated, for example, in the following manner. First, the portable electronic apparatus is placed on a desk and signals output from the magnetic sensor unit are measured as first values. Next, signals output from the magnetic sensor unit are measured as second values in the state that the portable electronic apparatus is rotated by 180° on the desk. A sum of the first and second values is divided by 2 (an average of the first and second values is obtained). This estimation requires the user to rotate the portable electronic phone by 180° on the desk and perform other operations. These operations are cumbersome for the user so that the number of such operations is desired as small as possible.

It is preferable that the correcting means measures at a first temperature and a second temperature different from the first temperature the influence of the magnetic field of the permanent magnets contained in the signals output from the magnetic sensors, and estimates the influence of the magnetic field of the permanent magnets from the influences at the first and second temperatures, and the present temperature detected with the temperature sensor.

By measuring the influences of the magnetic field of the permanent magnets at the first and second temperatures, the influence at another temperature can be estimated. Accordingly, the direction can be measured at high precision while the number of operations to be performed by the user for the influence estimation is reduced. According to experiments, the magnetic field of the permanent magnets of a portable electronic apparatus is approximately in proportion to the temperature of the permanent magnets. Accordingly, the influence at the temperature of the present time can be estimated easily through linear interpolation or extrapolation of the influences at the first and second temperatures relative to the temperature.

Measurements of the influence of the magnetic field of the permanent magnets inevitably contain a measurement error. Therefore, if a difference between the first and second temperatures is too small when the influence of the magnetic field of the permanent magnets at another temperature is estimated from the influences of the magnetic field of the permanent magnets at the first and second temperatures, there is a fear that the measurement error of the influence at each temperature may greatly degrade the estimation precision of the influence at another temperature.

To avoid this, the corrector is preferably provided with an initialization prompting device for prompting a user of the portable electronic apparatus to perform an operation of acquiring the influence at the second temperature when a difference between the first temperature and a temperature detected with the temperature sensor after measuring the influence at the first temperature becomes a predetermined temperature or higher. This initialization prompting device may be a device for displaying such effect on the display unit of the portable electronic apparatus or a device for producing sounds of a message of such effect from a sound producing device of the portable electronic apparatus.

If the influences at the first and second temperatures are acquired in the above manner, it is possible to prevent the measurement error contained in the measurements of the influences from greatly degrading the estimation precision of the influence at another temperature. Since the user is notified the time when the influence is measured at the second temperature, it is possible to avoid unnecessary initialization operations.

According to another aspect of the present invention, there is provided a magnetic sensor comprising: a substrate; a magnetic sensor element formed on the substrate for outputting a signal corresponding to the direction and amplitude of an external magnetic field; and a temperature sensor formed on the substrate for sensing a temperature.

It is possible to provide a magnetic sensor which is compact, inexpensive and capable of compensating the influence of the magnetic field of the permanent magnet upon the direction measurement relative to the temperature of the permanent magnets, and is suitable for the portable electronic apparatus having permanent magnets.

It is preferable that the magnetic sensor includes a plurality of magnetic sensor elements and that the magnetic sensor element is a magnetoresistive effect element having a pinned layer with a fixed magnetization direction and a free layer whose magnetization direction changes with the external magnetic field and the magnetic sensor element changes its resistance value in accordance with an angle between the magnetization direction of the pinned layer and the magnetization direction of the free layer, and that the magnetization directions of the pinned layers of at least two elements among the plurality magnetoresistive effect elements are crossed.

A magnetic sensor capable of measuring a direction at high precision can therefore be provided by using a giant magnetoresistive effect (GMR) element or a magnetic tunneling effect (TMR) element.

It is also preferable that the magnetic sensor includes a digital signal processing circuit formed on the same substrate.

It is possible to provide a magnetic sensor which is more compact, capable of processing signals in the form of digital signals, and is suitable for the portable electronic apparatus.

According to a further aspect of the present invention, there is provided a direction measuring method comprising steps of: preparing a portable electronic apparatus comprising a casing having a first plane, a communication device accommodated in the casing and having permanent magnets, magnetic sensors accommodated in the casing and outputting signals corresponding to an external magnetic field, and an input device formed on the first plane for inputting an operation signal; measuring signals output from the magnetic sensors as first values when the operation signal is input, in a state that the first plane of the portable electronic apparatus is turned upside; measuring signals output from the magnetic sensors as second values when the operation signal is input, in a state that the first plane of the portable electronic apparatus is turned upside and the portable electronic apparatus is rotated by 180° after the first values are measured; estimating an influence of a magnetic field by the permanent magnets upon the signals output from the magnetic sensors in accordance with the first and second values; correcting the signals output from the magnetic sensors in accordance with the estimated influence; and determining a direction in accordance with the corrected signals of the magnetic sensors.

The geomagnetism of the same amplitude and opposite directions is applied to the magnetic sensors before and after the portable electronic apparatus is rotated by 180°. Therefore, each sum of the outputs of the magnetic sensors before and after the portable electronic apparatus is rotated by 180° is independent from the geomagnetism, and corresponds to the influence of the magnetic field of the permanent magnets upon the outputs of the magnetic sensors. By using this sum, the influence of the magnetic field of the permanent magnets can be estimated easily and at high precision. By determining the direction in the above manner, the direction can be measured easily and at high precision.

DESCRIPTION OF THE PREFERRED EMBODIMENT

Figure 1:
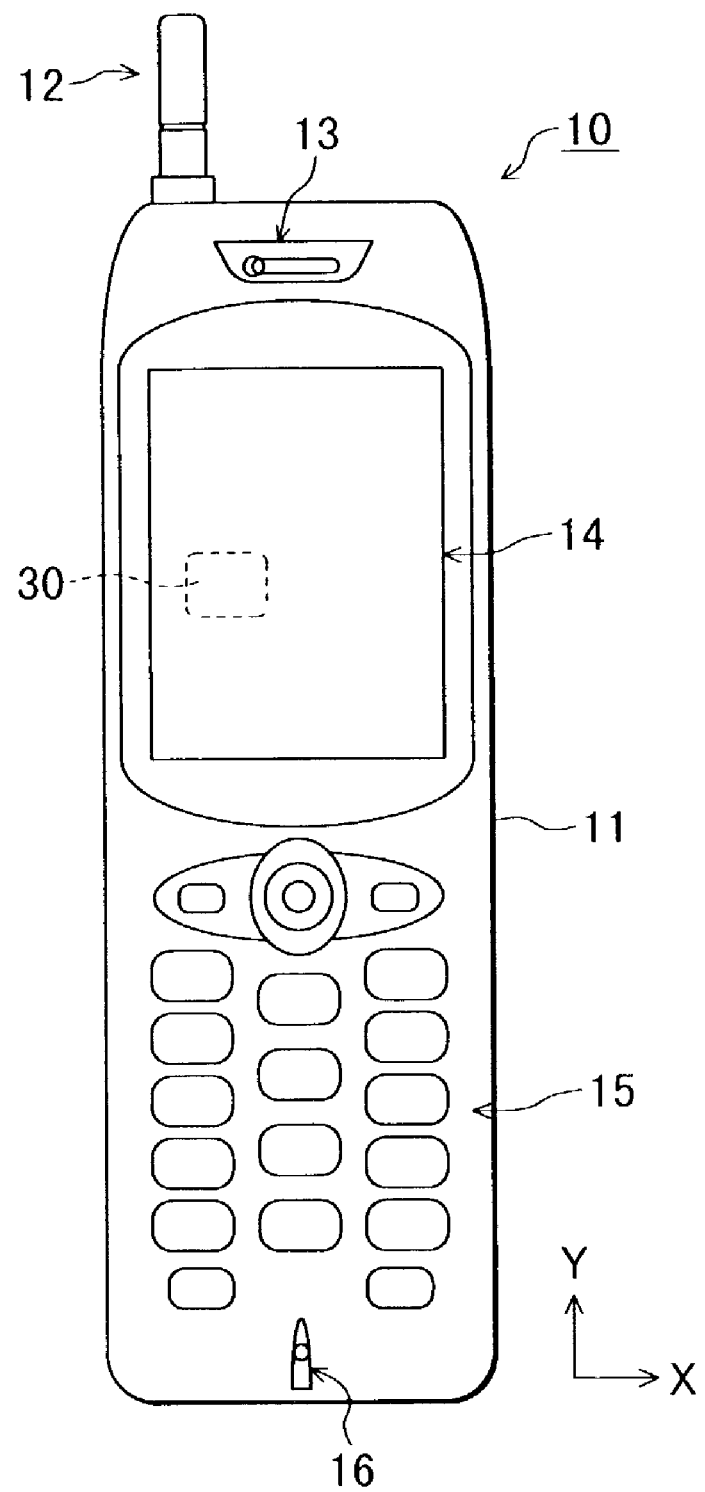
FIG. 1 is a front view of a portable phone having a magnetic sensor unit according to the invention.

A portable electronic apparatus according to an embodiment of the invention will be described with reference to the accompanying drawings, by using a portable phone as an example of the portable electronic apparatus. As shown in the schematic plan view of FIG. 1, the portable phone 10 has a casing 11, an antenna unit 12, a speaker unit 13, a liquid crystal display unit 14, an operation unit (operation signal input unit) 15 and a microphone unit 16. The casing 11 is generally rectangular having sides extending along orthogonal X- and Y-axes as viewed in plan in FIG. 1. The antenna unit 12 is disposed at the upper right or left side of the casing 11. The speaker unit 13 is disposed at the uppermost front side of the casing 11. The liquid crystal display unit 14 is disposed at the front side of the casing 11 under the speaker unit 13. The liquid crystal display unit 14 is used for displaying characters and graphic. The operation unit 15 is disposed at the front side of the casing 11 under the liquid crystal display unit 14. The operation unit 15 is used for entering a telephone number and other command signals. The microphone unit 16 is disposed at the lowermost front side of the casing 11. Some or all of the antenna unit 12, speaker unit 13, liquid crystal display unit 14, operation unit 15 and microphone unit 16 constitute a communication device including permanent magnets.

Figure 2:
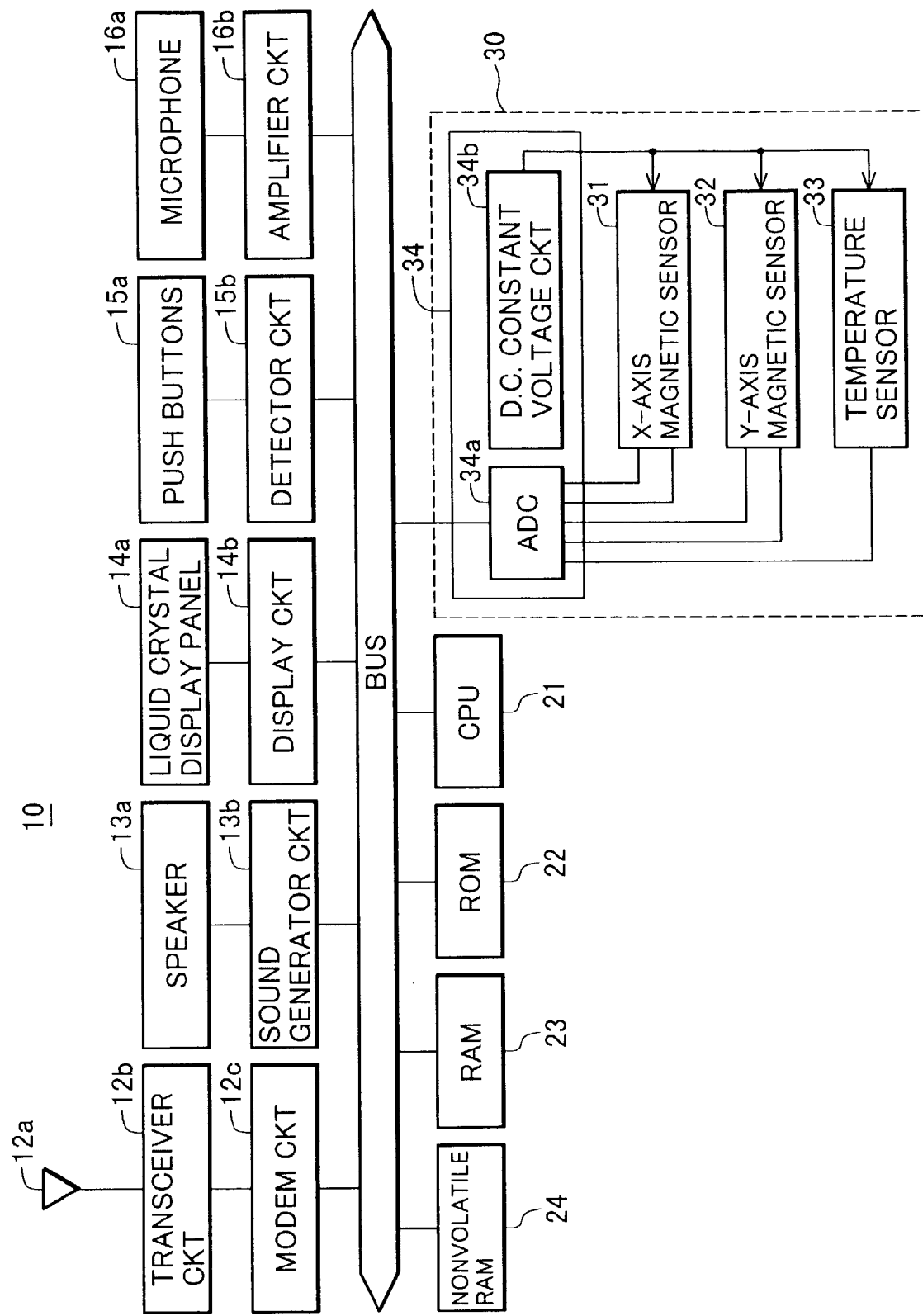
FIG. 2 is a block diagram showing the structure of electronic circuits of the portable phone shown in FIG. 1.

FIG. 2 is a block diagram showing the outline of electronic circuits of the portable phone 10. The portable phone 10 has a CPU 21, a ROM 22, a RAM 23 and a nonvolatile RAM 24 interconnected by a bus. CPU 21 executes various programs stored in ROM 22. RAM 23 temporarily stores data and the like necessary for CPU 21 to execute programs. Data is written in the nonvolatile RAM 24 in response to an instruction from CPU 21 while the main power source of the portable phone 10 is turned on, and this written data is stored and retained even during the turn-off period of the main power source. In response to a request from CPU 21 during the turn-on period of the main power source, the retained data is supplied to CPU 21. The nonvolatile RAM 24 may be replaced by an EEPROM.

The antenna unit 12 has a transceiver antenna 12a, a transceiver circuit 12b connected to the antenna 12a, and a modem circuit 12c connected to the transceiver circuit 12b. The modem circuit 12c demodulates a signal received by the transceiver circuit 12b, and modulates a signal to be transmitted and supplies it to the transceiver circuit 12b. The speaker unit 13 has a speaker 13a including a permanent magnet and a sound generator circuit 13b connected to the speaker 13a for generating a signal which is supplied to the speaker 13a to reproduce a corresponding sound. The liquid crystal display unit 14 has a liquid crystal display panel 14a and a display circuit 14b connected to the liquid crystal display panel 14a. The liquid crystal display panel 14a is disposed at the front side of the casing 11 of the portable phone 10. The display circuit 14b generates a signal which is supplied to the liquid crystal display panel 14a to display corresponding data. The operation unit 15 has a plurality of push buttons 15a and a detector circuit 15b connected to the push buttons 15a for detecting an on/off state of each push button 15a. The microphone unit 16 has a microphone 16a and an amplifier circuit 16b connected to the microphone 16a for amplifying a sound signal input from the microphone 16a. Of these units, the modem circuit 12c, sound generator circuit 13b, display circuit 14b, detector circuit 15b and amplifier circuit 16b are connected via the bus to CPU 21 and controlled by CPU 21.

Figure 3:
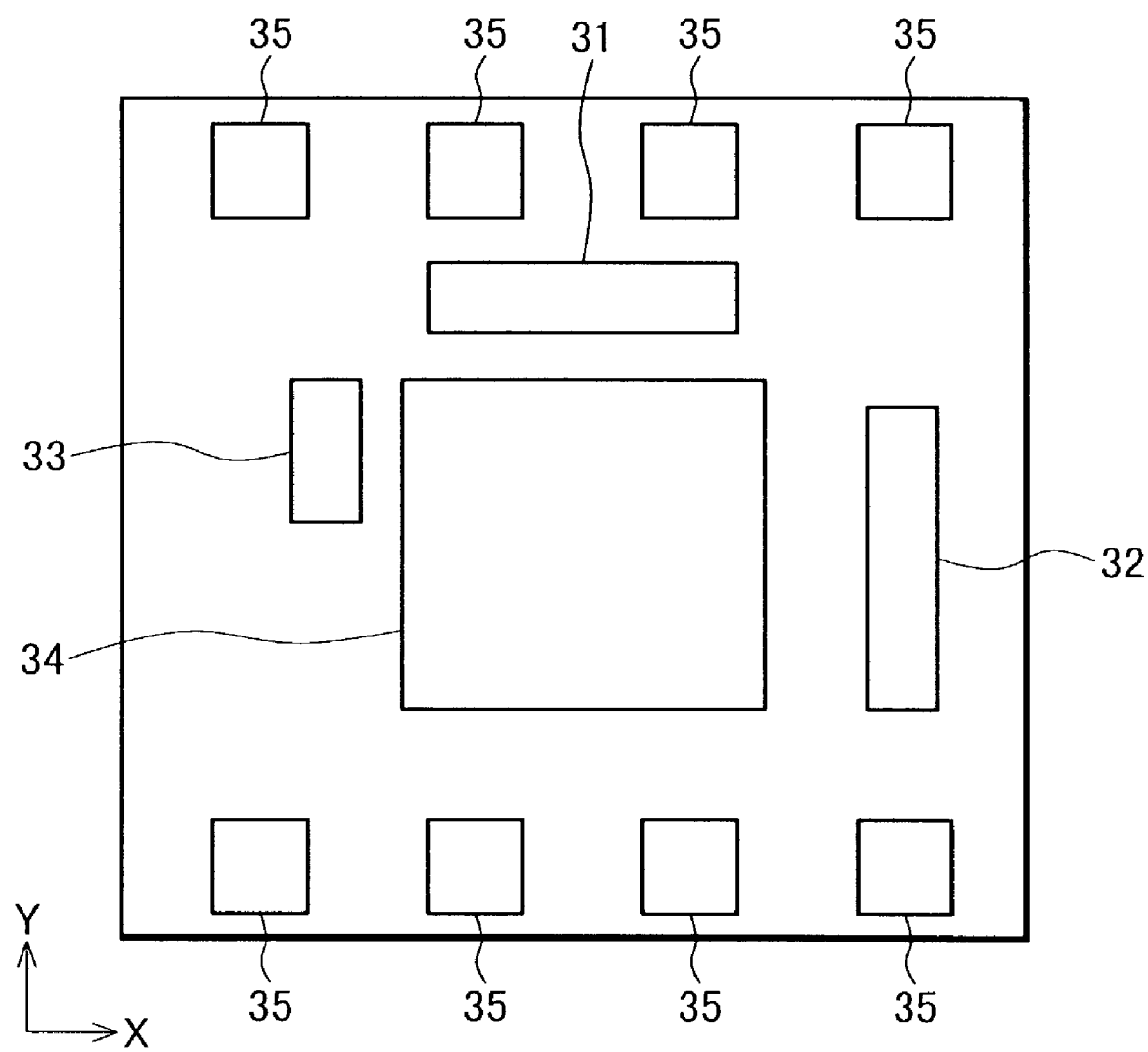
FIG. 3 is a plan view (component layout) of the magnetic sensor unit shown in FIG. 2.

The portable phone 10 has also a magnetic sensor unit 30 for outputting a signal corresponding to the direction and amplitude of an external magnetic field. The magnetic sensor unit 30 has an X-axis magnetic sensor 31, a Y-axis magnetic sensor 32, a temperature sensor 33, and a control circuit (digital signal processor) 34. As shown in FIG. 3 which is a schematic plan view of the magnetic sensor unit 30, these X-axis magnetic sensor 31, Y-axis magnetic sensor 32, temperature sensor 33 and control circuit 34 as well as a plurality of pads 35 are formed on a single chip of generally a square shape. The magnetic sensor unit 30 is held in the portable phone 10 generally in parallel to the plane (front side of the casing) of the liquid crystal display panel 14a as indicated by broken lines in FIG. 1.

Reverting to FIG. 2, the control circuit 34 has an A/D converter (ADC) 34a and a d.c. constant voltage circuit 34b. The control circuit 34 has a function of processing the signals output from the X-axis magnetic sensor 31, Y-axis magnetic sensor 32 and temperature sensor 33 and outputting digital signals. The A/D converter 34a is connected via the bus to CPU 21. The A/D converter 34a A/D converts the signals output from the X-axis magnetic sensor 31, Y-axis magnetic sensor 32 and temperature sensor 33 connected to the A/D converter 34a and supplies A/D converted digital data to CPU 21. The d.c. constant voltage circuit 34b supplies a constant voltage to the X-axis magnetic sensor 31, Y-axis magnetic sensor 32 and temperature sensor 33 connected to the d.c. constant voltage circuit 34b.

Figure 4:
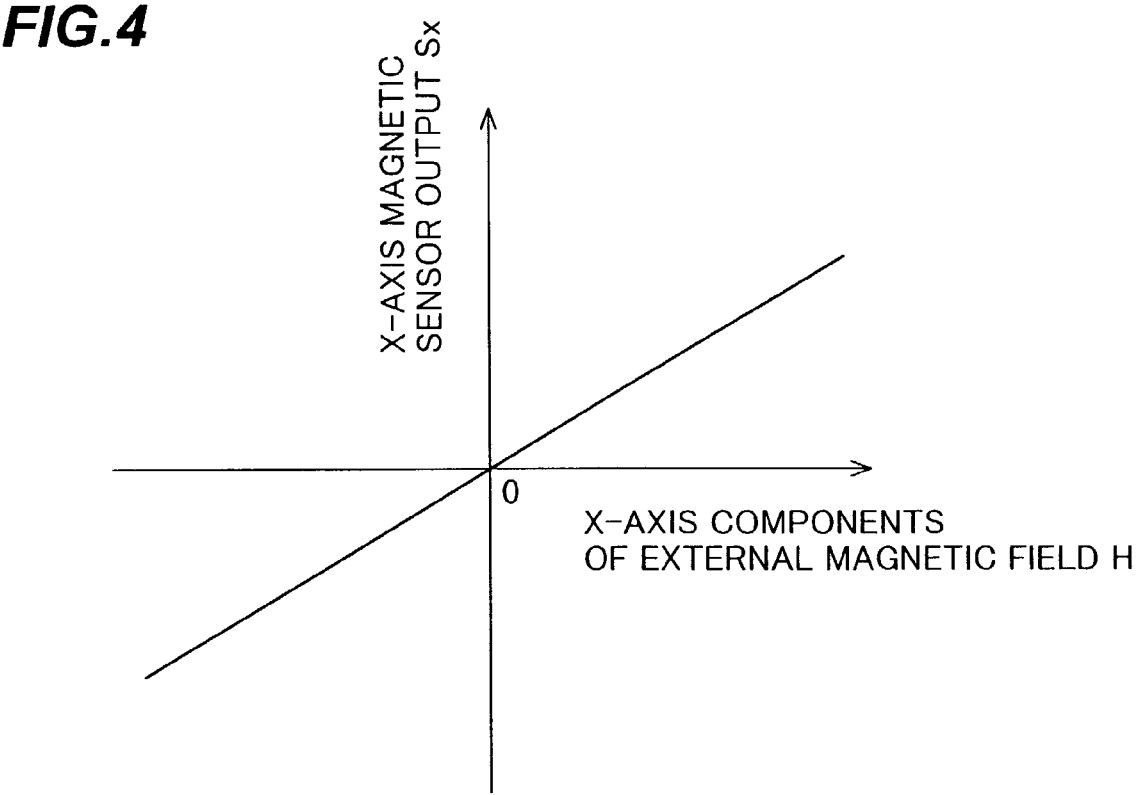
FIG. 4 is a graph showing the output characteristics of the X-axis components of an external magnetic field H detected with an X-axis magnetic sensor shown in FIG. 2.
Figure 5:
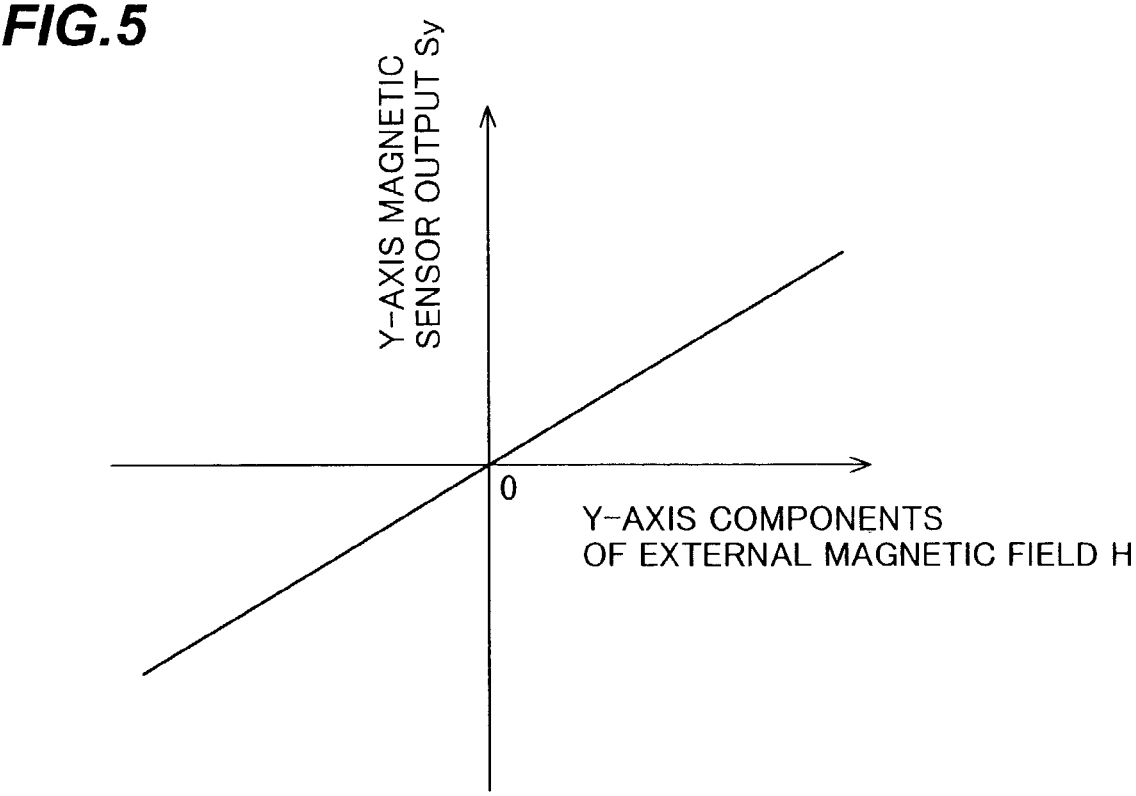
FIG. 5 is a graph showing the output characteristics of the Y-axis components of the external magnetic field H detected with a Y-axis magnetic sensor shown in FIG. 2.

FIG. 4 is a graph showing the relation between the X-axis components of an external magnetic field H and an output Sx of the X-axis magnetic sensor, and FIG. 5 is a graph showing the relation between the Y-axis components of the external magnetic field H and an output Sy of the Y-axis magnetic sensor. The X-axis magnetic sensor 31 in the state mounted on the portable phone 10 outputs a signal value proportional to the X-axis components of the external magnetic field. Similarly, the Y-axis magnetic sensor 32 in the state mounted on the portable phone 10 outputs a signal value proportional to the Y-axis components of the external magnetic field. The X-axis magnetic sensor 31 and Y-axis magnetic sensor 32 have the same structure that a signal value proportional to the amplitude of a magnetic field along each predetermined direction is output, and are disposed on the single chip of the magnetic sensor unit 30 in such a manner that the predetermined directions (magnetic field detection directions) are perpendicular. The magnetic sensor unit 30 is mounted on the portable phone 10 in such a manner that the X-axis magnetic sensor 31 and Y-axis magnetic sensor 32 output signal values proportional to the magnetic field amplitudes along the directions in parallel to the X- and Y-axes of the casing 11 of the portable phone 10.

Figure 6:
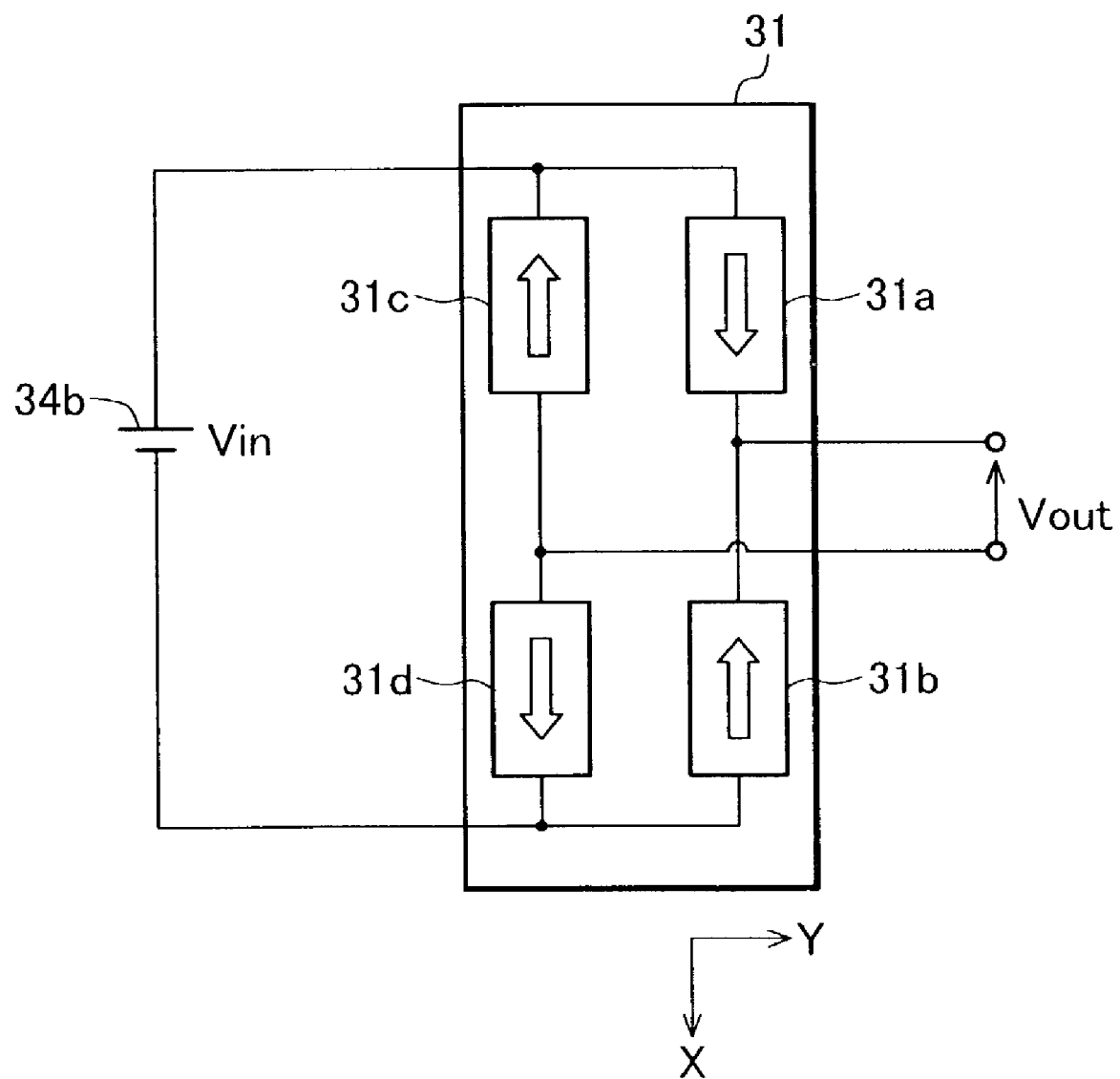
FIG. 6 is an equivalent circuit diagram of the X-axis magnetic sensor shown in FIG. 2.

FIG. 6 is an equivalent circuit of the X-axis magnetic sensor 31. The structure of the X-axis magnetic sensor 31 will be described in detail. The structure of the Y-axis sensor 32 is similar to that of the X-axis magnetic sensor 31. The X-axis magnetic sensor 31 has first to fourth magnetic tunneling effect element groups 31a, 31b, 31c and 31d connected to form a full-bridge circuit.

Each of the first to fourth magnetic tunneling effect element groups 31a, 31b, 31c and 31d has the same structure. The structure of the first magnetic tunneling effect element group 31a will be described as a representative example of these elements.

Figure 7:
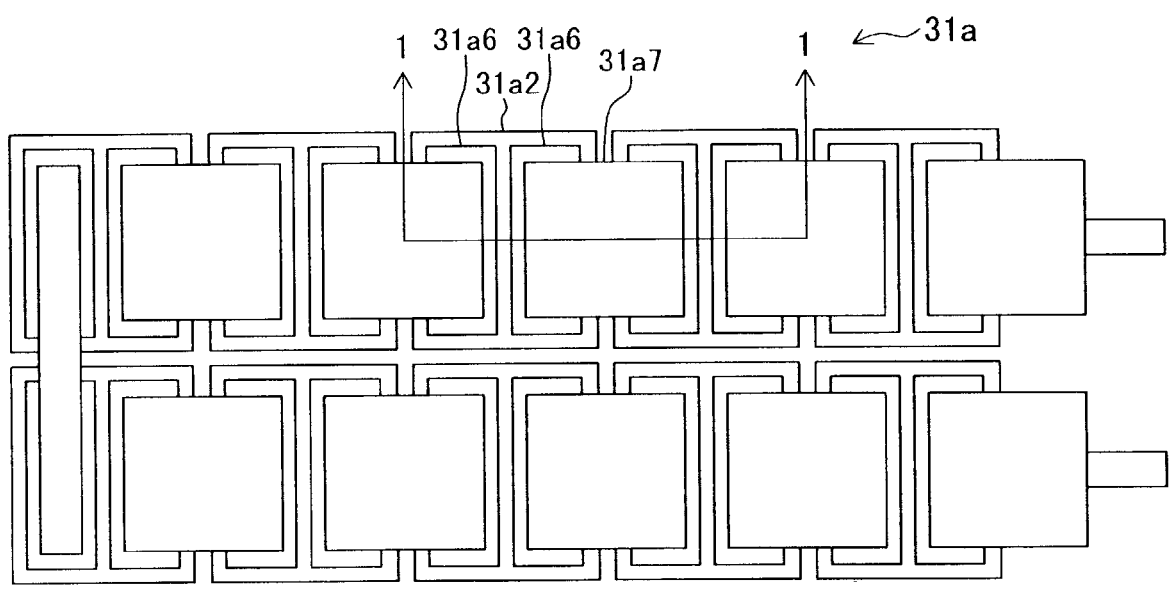
FIG. 7 is a schematic plan view of a first magnetic tunneling effect element group shown in FIG. 6.
Figure 7:
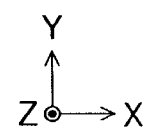

FIG. 7 is an enlarged plan view of the first magnetic tunneling effect element group 31a. The first magnetic tunneling effect group 31a is constituted of a plurality of serially connected magnetic tunneling effect elements (in this example, twenty elements).

Figure 8:
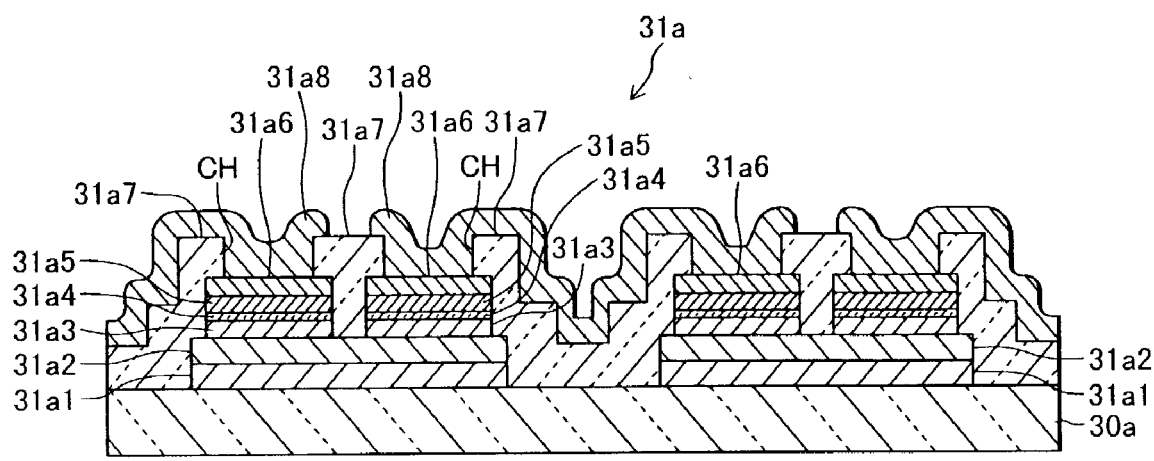
FIG. 8 is a schematic cross sectional view of the first magnetic tunneling effect element group shown in FIG. 7 and taken along line 1—1 shown in FIG. 7.

FIG. 8 is a partial cross sectional view of the first magnetic tunneling effect element group 31a taken along line 1—1 shown in FIG. 7. The magnetic element tunneling effect group has a plurality of lower electrodes 31a1 of a rectangular shape formed on a substrate 30a. The lower electrodes 31a1 are disposed laterally (along the X-axis direction) in rows at a predetermined interval. The lower electrode 31a1 is made of conductive nonmagnetic metal material of Cr (or Ta, Ti) and has a film thickness of about 30 nm. On each lower electrode 31a1, an antiferromagnetic film 31a2 having the same plan shape as the lower electrode 31a1 is stacked. The antiferromagnetic film 31a2 is made of PtMn and has a film thickness of about 30 nm.

On each antiferromagnetic film 31a2, a pair of ferromagnetic films 31a3 made of NiFe and having a film thickness of about 10 nm is stacked with some gap between the films 31a3. The ferromagnetic film 31a3 has a rectangular shape as viewed in plan and their longer sides are disposed in parallel.

Figure 9:
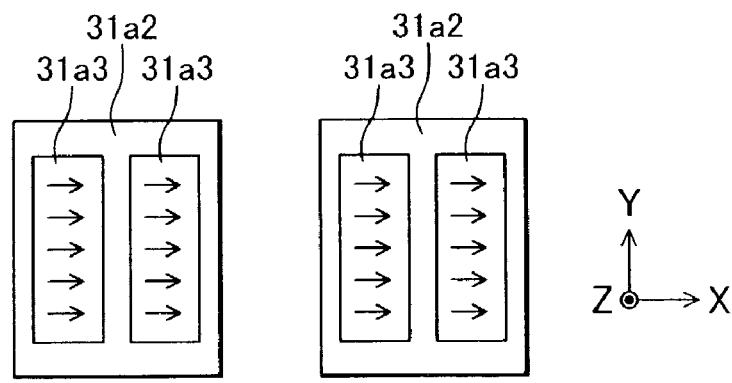
FIG. 9 is a schematic partial plan view of the first magnetic tunneling effect element group shown in FIG. 7.

FIG. 9 is a partial plan view of the first magnetic tunneling effect element group 31a shown in FIG. 7. The ferromagnetic film 31a3 constitutes a pinned layer whose magnetization direction is pinned along an arrow direction (a positive X-axis direction, i.e., a short side direction) by the antiferromagnetic film 31a2.

Reverting to FIG. 8, on each ferromagnetic film 31a3, an insulating layer 31a4 having the same plan shape as that of the ferromagnetic film 31a3 is stacked. This insulating layer 31a4 is made of insulating material of $Al_2O_3$(Al—O) and has a film thickness of 1 nm.

On the insulating layer 31a4, a ferromagnetic film 31a5 having the same plan shape as that of the insulating layer 31a4 is stacked. The ferromagnetic film 31a5 is made of NiFe and has a film thickness of about 40 nm.

This ferromagnetic film 31a5 constitutes a free layer (free magnetization layer) whose magnetization direction changes so as to approximately coincide with the direction of an external magnetic field. The ferromagnetic film 31a5, insulating film 31a4 and ferromagnetic film 31a3 or pinned layer constitute a magnetic tunneling junction structure. One magnetic tunneling effect element (excepting electrodes) is constituted of the antiferromagnetic film 31a2, ferromagnetic film 31a3, insulating layer 31a4 and ferromagnetic film 31a5.

On each ferromagnetic film 31a5, a dummy film 31a6 having the same plan shape as that of the ferromagnetic film 31a5 is stacked. This dummy film 31a6 is made of conductive nonmagnetic metal material of Ta and has a film thickness of about 40 nm.

An interlayer insulating layer 31a7 is formed covering the substrate 30a, lower electrodes 31a1, antiferromagnetic films 31a2, ferromagnetic films 31a3, insulating layers 31a4, ferromagnetic films 31a5 and dummy films 31a6. This interlayer insulating layer 31a7 electrically insulates a plurality of lower electrodes 31a1 and antiferromagnetic films 31a2, and also electrically insulates pairs of ferromagnetic films 31a3, insulating layers 31a4, ferromagnetic films 31a5 and dummy films 31a6, respectively formed on the antiferromagnetic films 31a2. The interlayer insulating layer 31a7 is made of $SiO_2$ and has a film thickness of about 250 nm.

Contact holes CH reaching the dummy films 31a6 are formed through the interlayer insulating layer 31a7. On this interlayer insulating layer 31a7, upper electrodes 31a8 are formed burying the contact holes CH and electrically connecting ones of the dummy films 31a6 formed above different lower electrodes 31a1 and antiferromagnetic films 31a2. For example, the upper electrode 31a8 is made of Al and has a film thickness of 300 nm. Adjacent pairs of ferromagnetic films 31a5 (and dummy films 31a6) and antiferromagnetic films 31a2 are, therefore, alternately and sequentially connected electrically by the lower electrodes 31a1 and antiferromagnetic films 31a2, and upper electrodes 31a8. In this manner, the magnetic tunneling effect element group 31a can be formed which has twenty serially connected magnetic tunneling junction structures having the pinned layers with the same magnetization direction. Although not shown, a passivation film of SiO and SiN is formed covering the upper electrodes 31a8.

Figure 10:
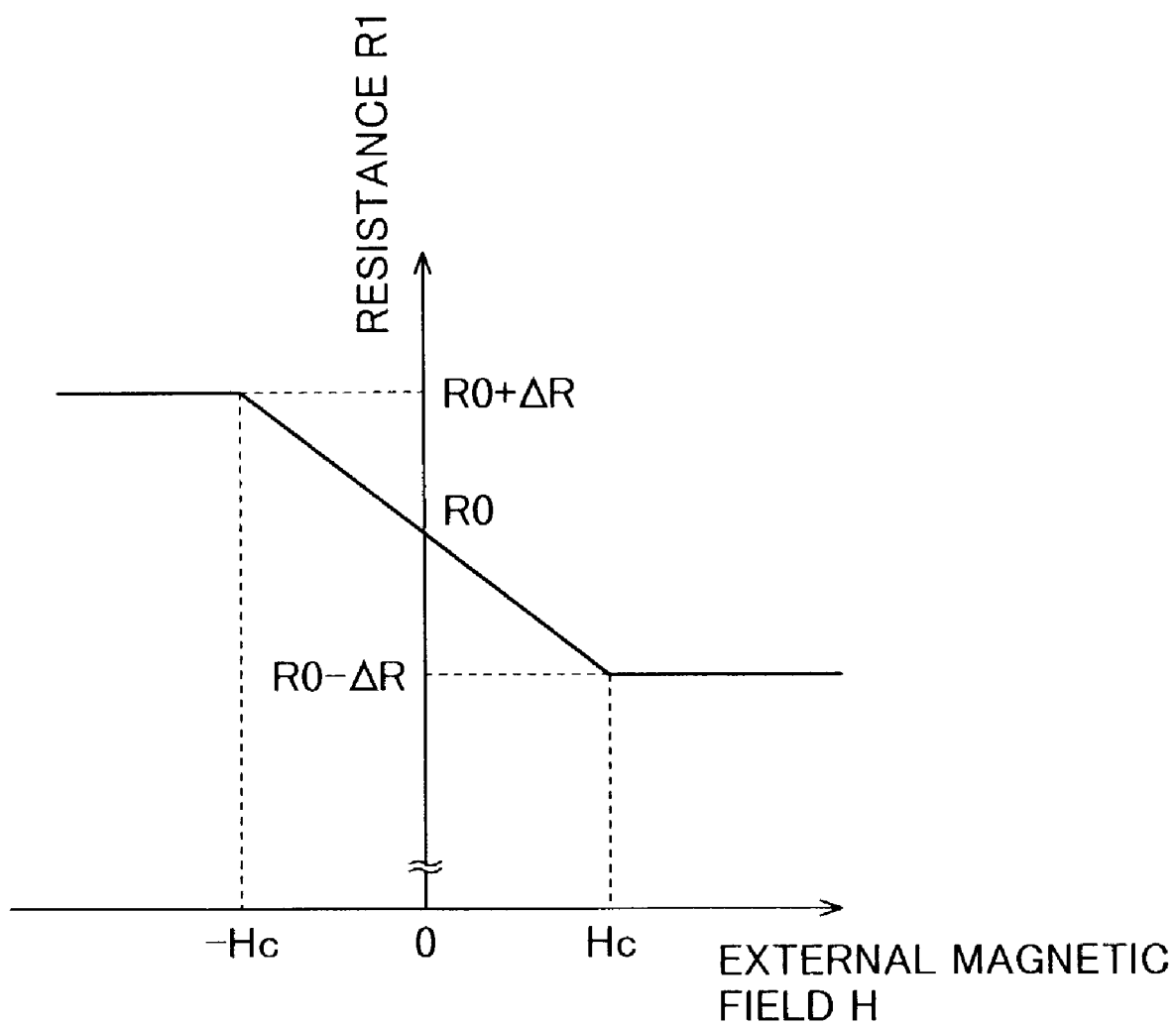
FIG. 10 is a graph showing the resistance change characteristics relative to an external magnetic field of the first magnetic tunneling effect element group shown in FIG. 7.

FIG. 10 is a graph showing the relation between an external magnetic field H and a resistance R1 of the first magnetic tunneling effect element group 31a formed as described above. The resistance R1 changes in proportion to the external magnetic field H in the range where the absolute value of the external magnetic field H is small (i.e., in the range of saturated magnetic fields −Hc to +Hc), the external magnetic field changing its amplitude along the magnetization direction of the pinned layer. Namely, the resistance R1 is given by the following equation (1):

$$R1 = -(\Delta R/Hc) \cdot H + R0 \quad (1)$$

As shown in FIG. 6, the X-axis magnetic sensor 31 has four magnetic tunneling effect element groups. The magnetization direction of the pinned layers of the magnetic tunneling effect element groups 31a to 31d are shown in FIG. 6 by arrows. The magnetization direction of the pinned layers of the first and fourth magnetic tunneling effect element groups 31a and 31d is the positive X-axis direction, whereas the magnetization direction of the pinned layers of the second and third magnetic tunneling effect element groups 31b and 31c is the negative X-axis direction. The resistance R1 of the first and fourth magnetic tunneling effect element groups 31a and 31d changes in accordance with the equation (1), whereas the resistance R2 of the second and third magnetic tunneling effect element groups 31b and 31c changes in accordance with the following equation (2):

$$R2 = (\Delta R/Hc) \cdot H + R0 \quad (2)$$

In the X-axis magnetic sensor 31, one end of the first magnetic tunneling effect element group 31a is connected to one end of the second magnetic tunneling effect element group 31b, and the other ends of the first and second magnetic tunneling effect element groups 31a and 31b are connected respectively to the positive and negative electrodes of the d.c. constant voltage circuit 34b. Similarly, one end of the third magnetic tunneling effect element group 31c is connected to one end of the fourth magnetic tunneling effect element group 31d, and the other ends of the third and fourth magnetic tunneling effect element groups 31c and 31d are connected respectively to the positive and negative electrodes of the d.c. constant voltage circuit 34b. A difference between a potential at the connection point between the first and second magnetic tunneling effect element groups 31a and 31b and a potential at the connection point between the third and fourth magnetic tunneling effect element groups 31c and 31d is picked up and supplied to the A/D converter 34a as an output Vout of the X-axis magnetic sensor 31.

The X-axis magnetic sensor 31 constructed as above detects the X-axis components Hx of the external magnetic field H in the X-axis direction, and outputs a signal Vout (=Sx) given by the following equation (3):

$$Sx = Vin \cdot (\Delta R/R0) \cdot (Hx/Hc) \qquad (3)$$

where Vin is a voltage of the d.c. constant voltage circuit 34b.

Figure 11:
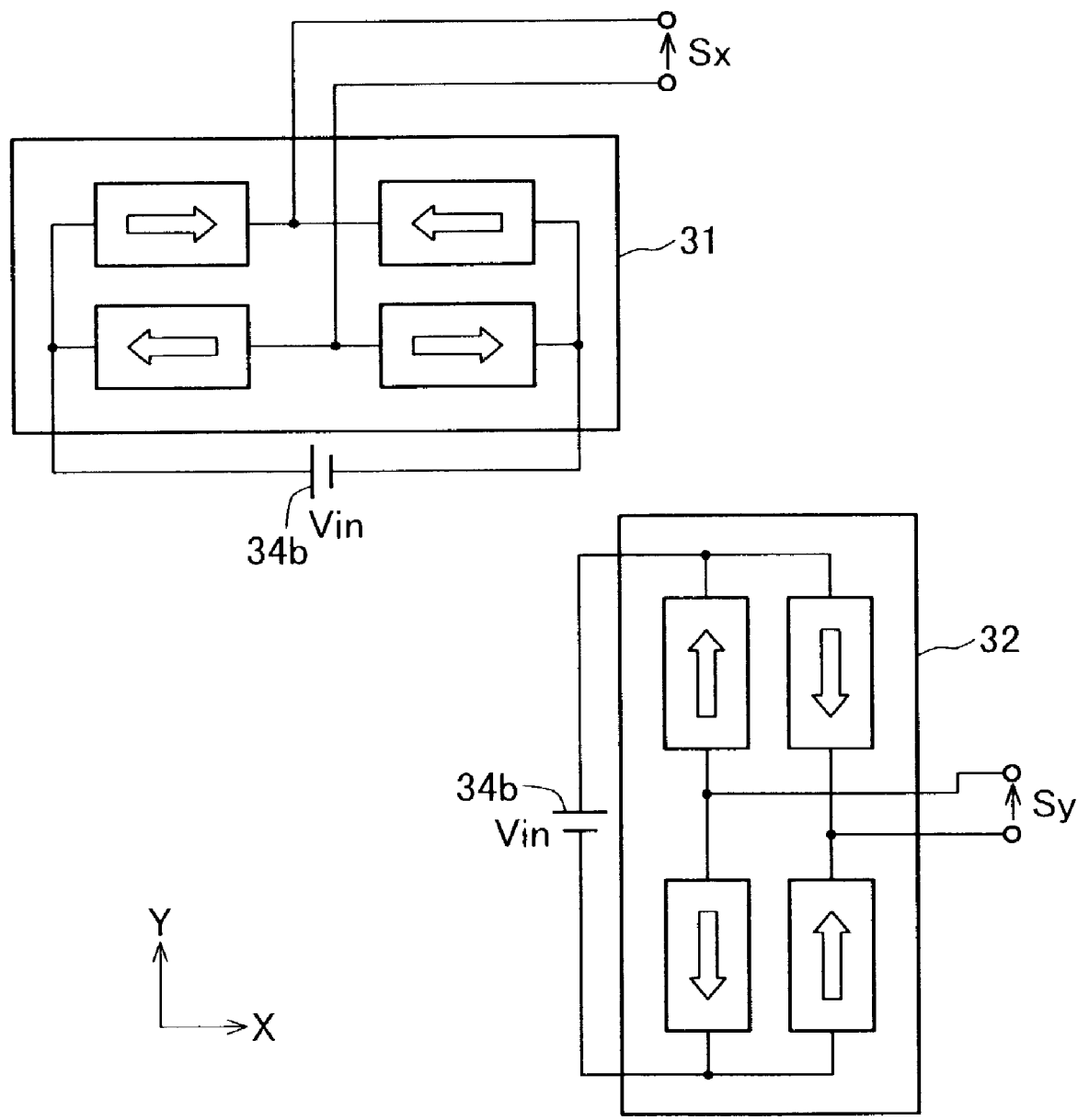
FIG. 11 is a diagram showing the positional relation between the X-axis magnetic sensor and Y-axis magnetic sensor shown in FIG. 2 and their electrical connection.

As shown in FIG. 11, the Y-axis magnetic sensor 32 having the same structure as that of the X-axis magnetic sensor 31 is disposed perpendicular to the X-axis sensor 31. The Y-axis magnetic sensor 32 detects the Y-axis components Hy of the external magnetic field H in the Y-axis direction, and outputs a signal Vout (=Sy) given by the following equation (4):

$$Sy = Vin \cdot (\Delta R/R0) \cdot (Hy/Hc) \qquad (4)$$

Figure 12:
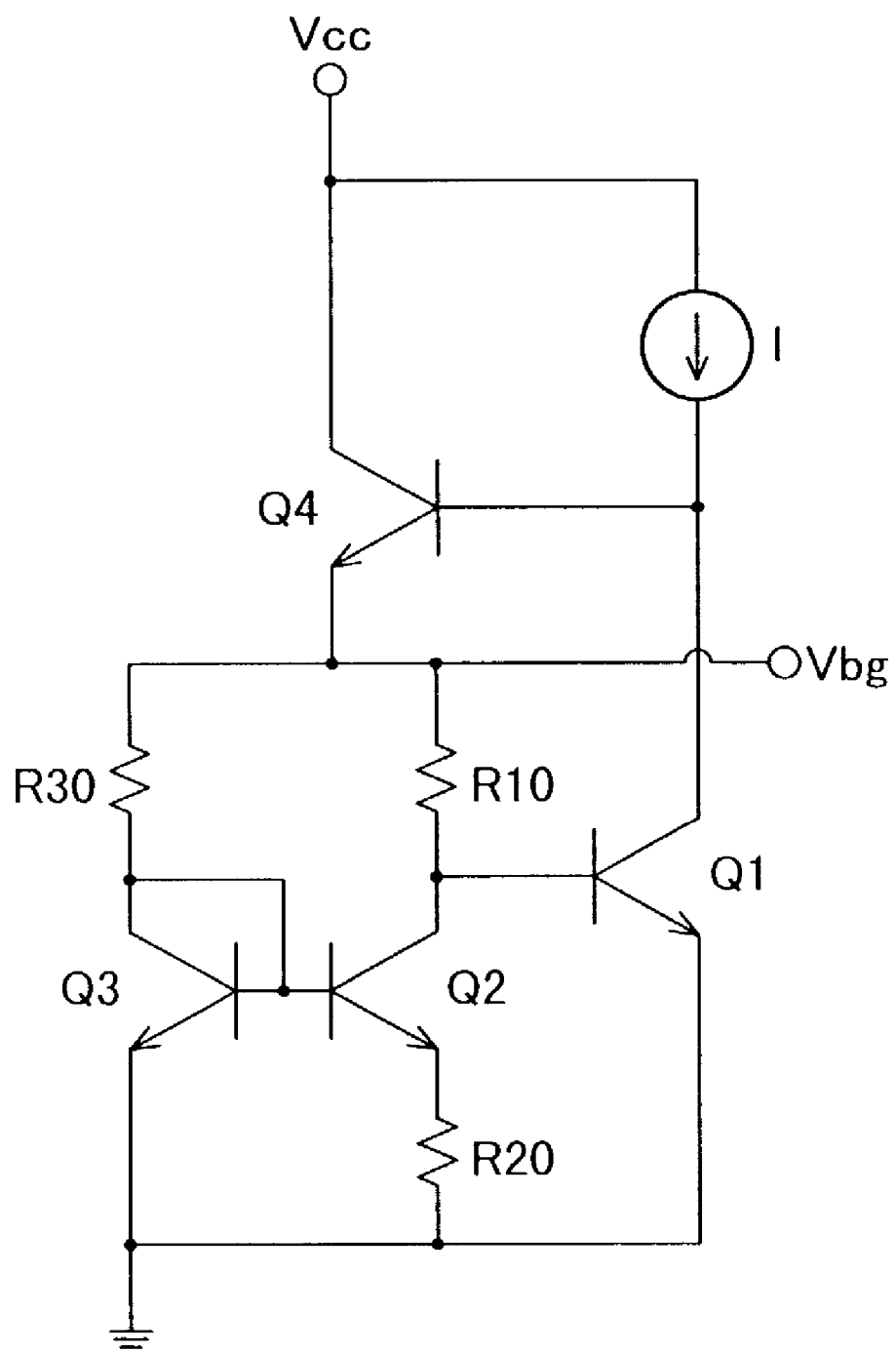
FIG. 12 is an equivalent circuit of a temperature sensor shown in FIG. 2.

The temperature sensor 33 is made of a band gap reference circuit. This circuit is a well known bias circuit one example of which is shown in FIG. 12. As shown, this circuit is constituted of a current source I without temperature dependency, four transistors Q1 to Q4 and three resistors R10 to R30. The connection of these components will be described. The current source I is connected between a voltage source Vcc and the collector of the transistor Q1. The emitter of the transistor Q1 is grounded, and the base thereof is connected to the connection point between one end of the resistor R10 and the collector of the transistor Q2. The emitter of the transistor Q2 is grounded via the resistor R20, and the base thereof is connected to the base and collector of the diode-connected transistor Q3. The emitter of the transistor Q3 is grounded, and the collector and base thereof are connected via the resistor R30 to the other end of the resistor R10 and the emitter of the transistor Q4. The base of the transistor Q4 is connected to the collector of the transistor Q1, and the collector thereof is connected to the voltage source Vcc. The voltage source Vcc is accommodated in the control circuit 34.

In this circuit shown in FIG. 12, the emitter area ratio of the transistor Q3 to the transistor Q2 is set to a predetermined value N larger than "1". An output voltage Vbg of the band gap reference circuit is given by the following equation (5):

$$Vbg = VBE_{Q3} + VT \cdot ln(N) \cdot R100/R200 \qquad (5)$$

where $VBE_{Q3}$ is a base-emitter voltage of the transistor Q3, VT is a thermal voltage, R100 is a resistance of the resistor R10, and R200 is a resistance of the resistor R20.

In the equation (5), it is known that $VBE_{Q3}$ has a negative temperature coefficient (−2 mV/K) and VT has a positive temperature coefficient (0.085 mV/K). As apparent from the equation (5), by properly selecting the resistance values R100 and R200, the temperature dependency of the output signal Vbg can be eliminated. In this embodiment, therefore, the resistance values R100 and R200 are selected so that the temperature dependency of the output signal Vbg can be eliminated. The temperature sensor 33 supplies a voltage (Vbg−$VBE_{Q3}$) across the resistance R30 to the A/D converter 34a.

Next, a direction measuring method by the portable phone 10 constructed as described above will be described on the assumption that the external magnetic field H applied to the magnetic sensor unit 30 is only geomagnetism. A direction of the portable phone 10 is defined as the direction of a vector directing from a distal portion (e.g., microphone unit 16) to the proximal portion (e.g., speaker unit 13) of the portable phone 10, i.e., a vector directing along the positive Y-axis direction, under the condition that the front side of the casing 11 of the portable phone 10 is generally horizontal and the front side is turned upside. In this specification, as shown in FIG. 13 the direction is defined on the assumption that the reference of the direction a is 0° (west), and takes 90°, 180°, and 270° as the direction a is rotated in the order from the north, east, to the south.

Figure 13:
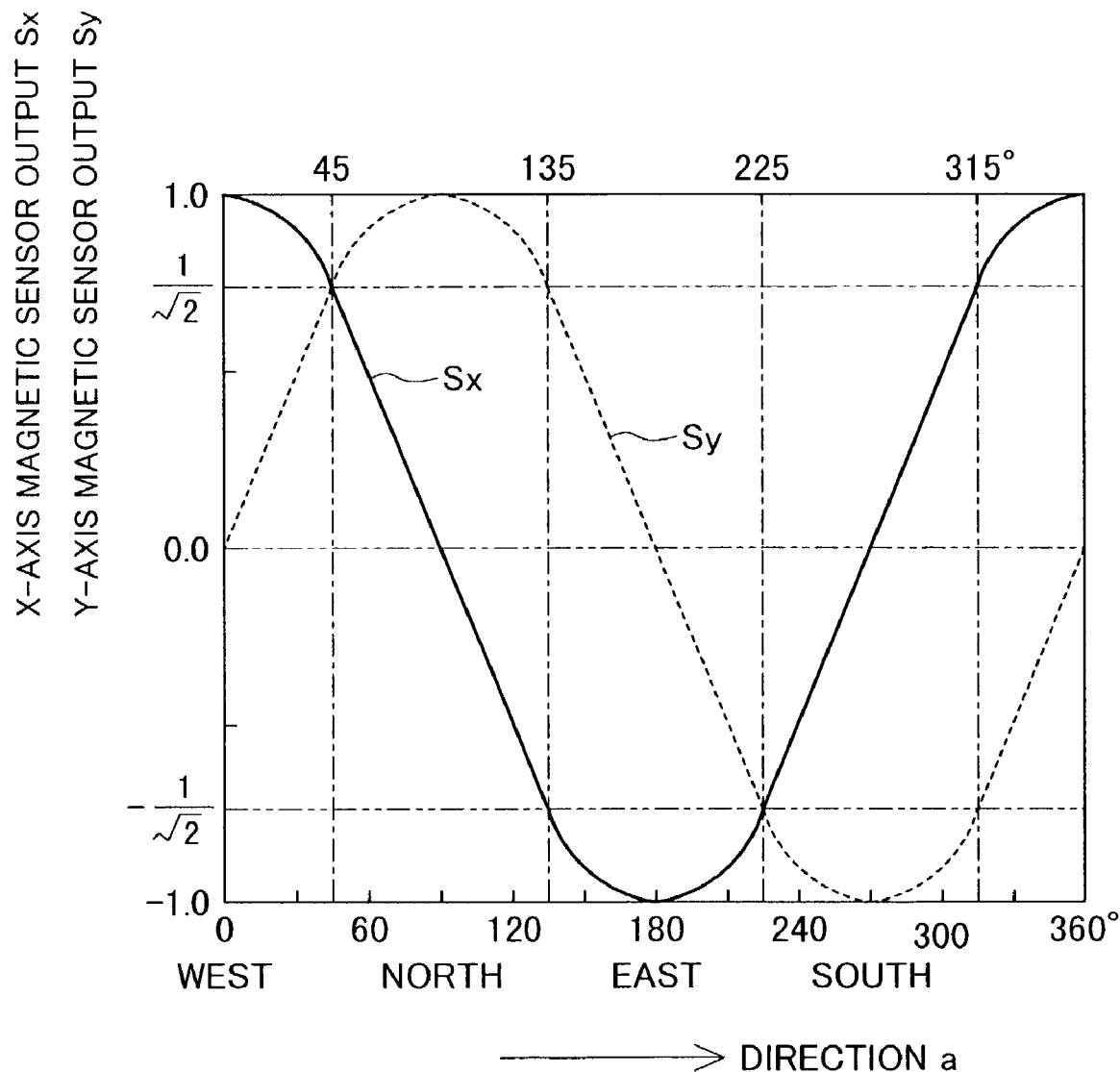
FIG. 13 is a graph showing outputs of the X-axis magnetic sensor and Y-axis magnetic sensor shown in FIG. 2 relative to the direction.

FIG. 13 is a graph showing the relation between the direction a of the portable phone 10 and sensor output signals Sx and Sy of the X- and Y-axis magnetic sensors 31 and 32.

Geomagnetism is a magnetic field directed from the south to north. If the front side of the casing 11 of the portable phone 10 is generally horizontal and the front side is turned upside, the output signals of the X- and Y-axis magnetic sensors 31 and 32 of the magnetic sensor unit 30 change cosinusoidally and sinusoidally relative to the direction a of the portable phone 10, as shown in FIG. 13. The values of the sensor output signals Sx and Sy shown in FIG. 13 are normalized values. More specifically, the actual output signal Sx of the X-axis magnetic sensor 31 is divided by a half of the difference between the maximum and minimum values of the output signal Sx which are obtained during the 360° rotation of the portable phone 10 under the condition that the front side of the casing 11 of the portable phone 10 is generally horizontal and the front side is turned upside. The actual output signal Sx divided by a half of the difference is used as the normalized value of the output signal value Sx. Similarly, the actual output signal Sy of the Y-axis magnetic sensor 32 is divided by a half of the difference between the maximum and minimum values of the output signal Sy which are obtained during the 360° rotation of the portable phone 10 under the condition that the front side of the casing 11 of the portable phone 10 is generally horizontal and the front side is turned upside. The actual output signal Sy divided by a half of the difference is used as the normalized value of the output signal value Sy.

As seen from the graph shown in FIG. 13, the direction a of the portable phone 10 can be obtained by taking the following four cases (1) to (4) into consideration:

(1) If Sx>0 and |Sx|>|Sy|, a=tan$^{-1}$(Sy/Sx)
(2) If Sx<0 and |Sx|>|Sy|, a=180°+tan$^{-1}$(Sy/Sx)
(3) If Sy>0 and |Sx|<|Sy|, a=90°−tan$^{-1}$(Sx/Sy)
(4) If Sy<0 and |Sx|<|Sy|, a=270°−tan$^{-1}$(Sx/Sy)

If the direction obtained in any one of the four cases (1) to (4) is negative, 360° is added to the direction a to use this result as the direction a. If the direction obtained is 360° or larger, 360° is subtracted from the direction a to use this result as the direction a.

Figure 14:
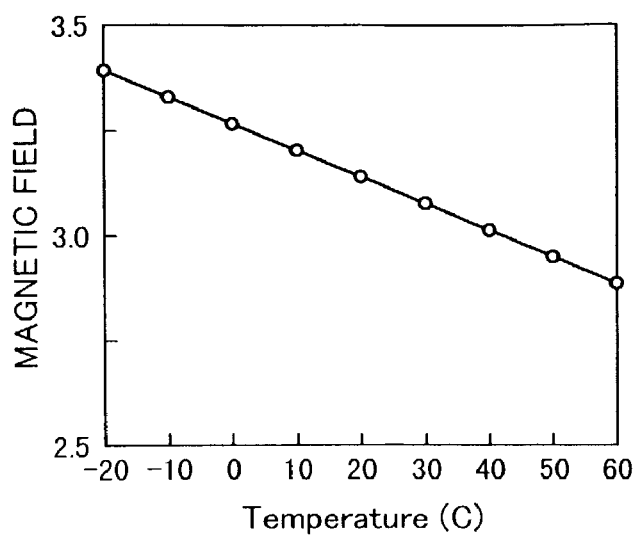
FIGS. 14 to 16 are graphs showing the temperature characteristics of magnetic fields of different permanent magnets in the portable phone shown in FIG. 1.
Figure 15:
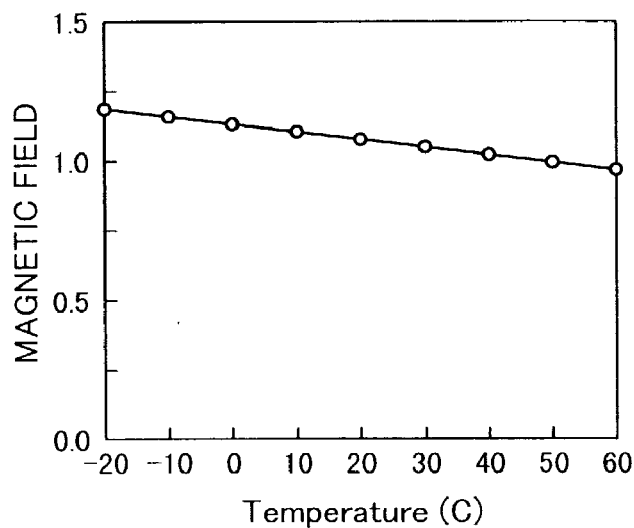
Figure 16:
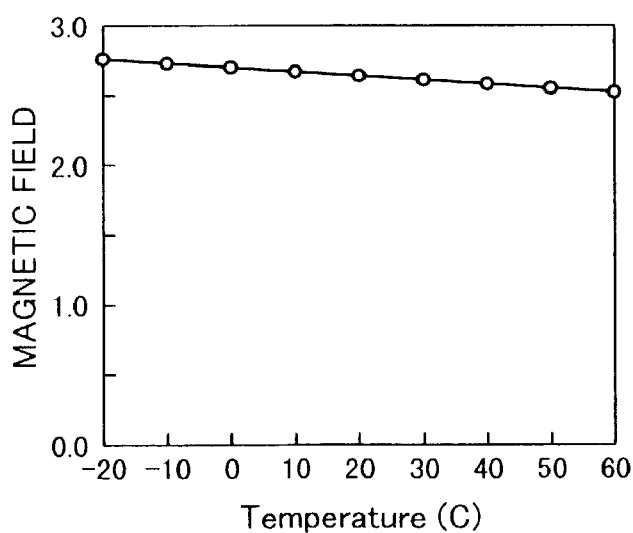

The portable phone 10 has many permanent magnets of the speaker 13a and the like. The permanent magnet generates a leak magnetic field. FIGS. 14 to 16 are graphs showing the temperature characteristics of a leak magnetic field from permanent magnets in the portable phone 10. The strength of the leak magnetic field depends on the strength of the permanent magnet at the temperature at the time of measuring, and the distance between the permanent magnet and a measuring point. FIGS. 14–16 are graphs showing the temperature dependent characteristics of leak magnetic fields of different permanent magnets on the condition that the distance between the permanent magnet and a measuring point is constant. In the graphs, the abscissa represents temperature, and the ordinate represents the strength of the leak magnetic field. Provided that the distance between the magnet and the measuring point is constant, the strength of the leak magnetic field has a relation with negative coefficient with respect to the temperature. Therefore, the leak magnetic field (external magnetic field other than geomagnetism) from these permanent magnets having an amplitude approximately proportional to the temperature of these permanent magnets and approximately the same direction is applied to the magnetic sensor unit 30 disposed at the predetermined position in the portable phone 10.

Figure 17:
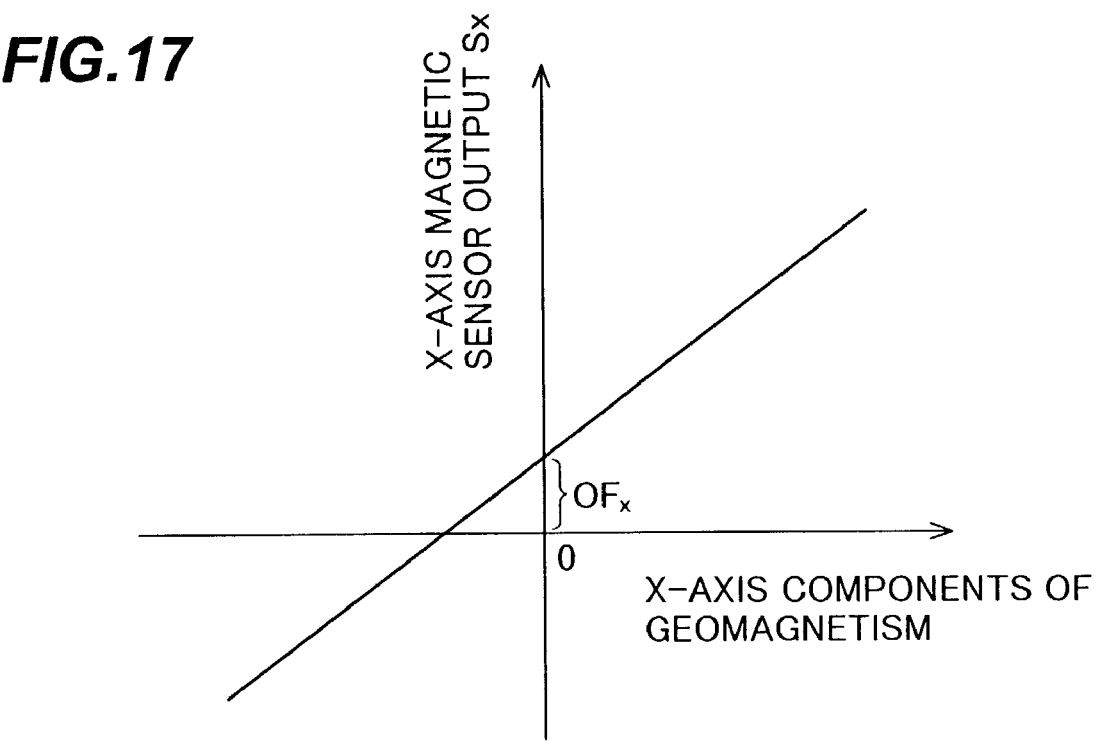
FIG. 17 is a graph showing the output characteristics of the X-axis magnetic sensor shown in FIG. 2 relative to geomagnetism.
Figure 18:
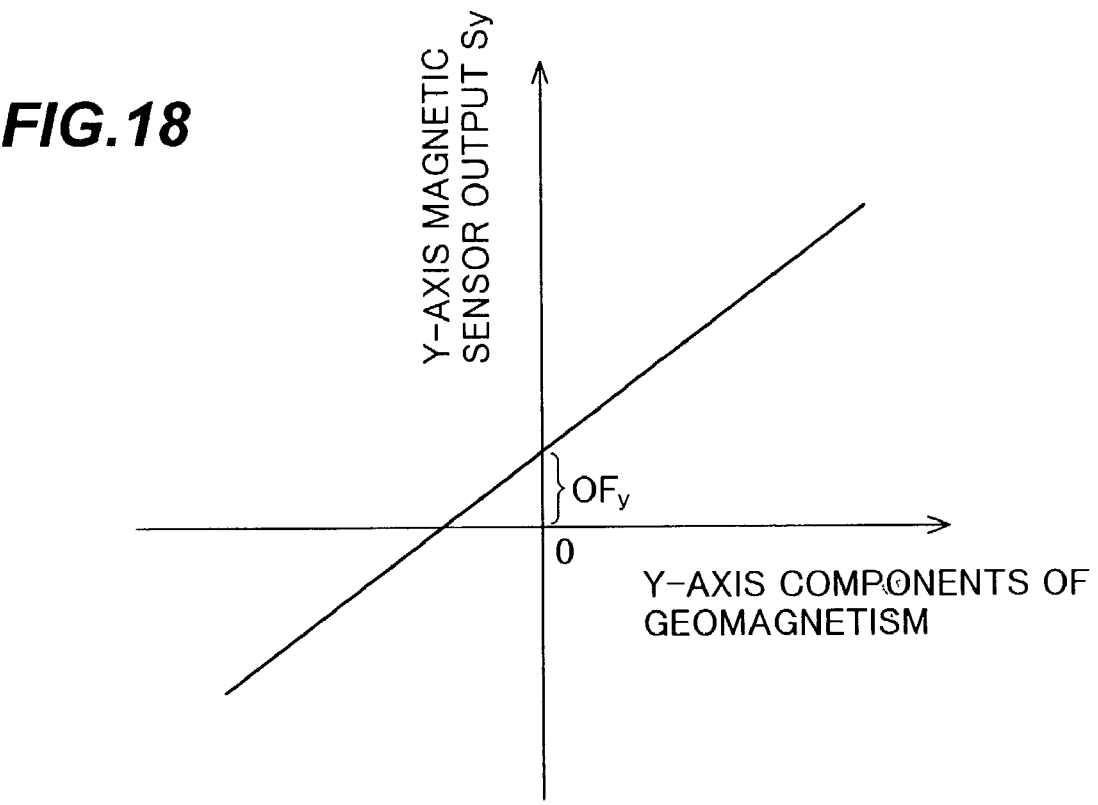
FIG. 18 is a graph showing the output characteristics of the Y-axis magnetic sensor shown in FIG. 2 relative to geomagnetism.

As shown in the graph of FIG. 17, an output of the X-axis magnetic sensor 31 is shifted (parallel motion) by an offset amount OFx corresponding to the leak magnetic field. Similarly, as shown in the graph of FIG. 18, an output of the Y-axis magnetic sensor 32 is shifted by an offset amount OFy corresponding to the leak magnetic field. As described above, since the leak magnetic field changes in approximate proportion to the temperature of the permanent magnets, the offset amounts OFx and OFy also change in approximate proportion to the temperature of the permanent magnets. These offset amounts OFx and OFy can be regarded as the influence amounts by the permanent magnets upon the outputs of the magnetic sensor unit 30.

Figure 19:
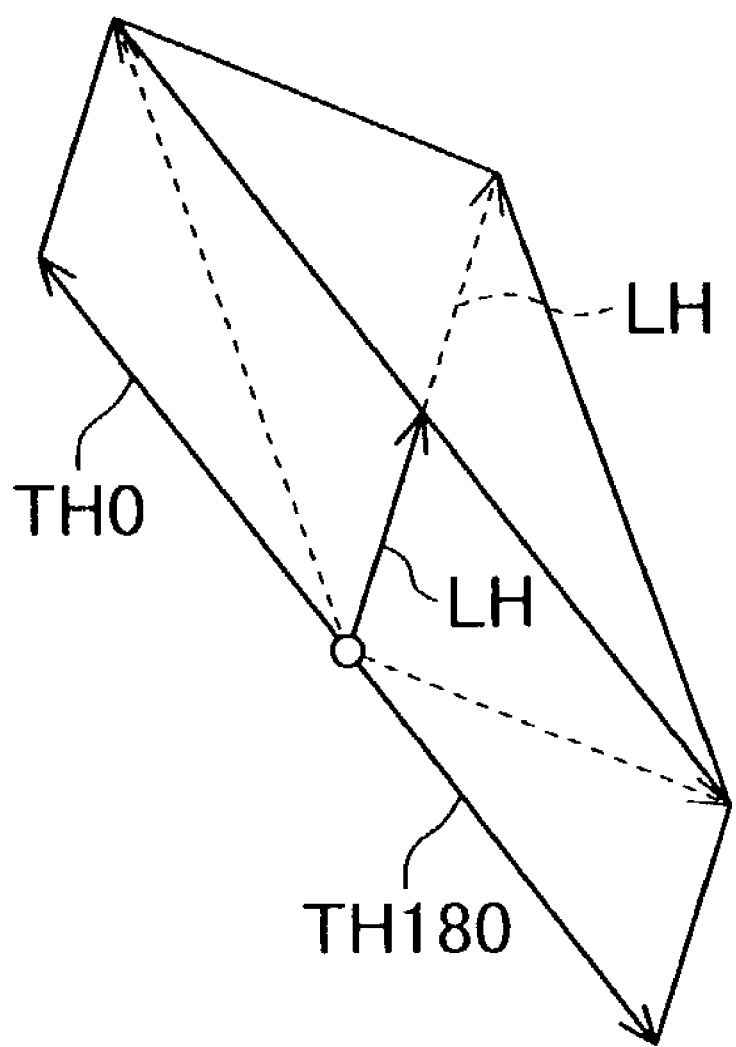
FIG. 19 is a vector diagram showing the relation between geomagnetism and a leak magnetic field of permanent magnets applied to the magnetic sensor unit shown in FIG. 2.

FIG. 19 is a vector diagram showing geomagnetism and leak magnetic field from the permanent magnets applied to the magnetic sensor unit 30 by using the magnetic sensor unit 30 as a reference.

First, the geomagnetism TH0 and leak magnetic field LH from the permanent magnets applied to the magnetic sensor unit 30 are drawn in this diagram in the state that the front side of the portable phone 10 is turned upside and the direction of the portable phone 10 is set to a predetermined (desired) direction. Next, the geomagnetism TH180 and leak magnetic field LH from the permanent magnets applied to the magnetic sensor unit 30 are drawn when the direction of the portable phone 10 is rotated by 180°. As seen from FIG. 19, the leak magnetic field LH from the permanent magnets having the same direction and amplitude is always applied to the magnetic sensor unit 30 irrespective of the direction of the portable phone 10. In contrast, the geomagnetism having the same amplitude and opposite direction is applied to the magnetic sensor unit 30 when the portable phone 10 is rotated by 180°. The offset amount OFx of the X-axis magnetic sensor 31 can be given by the following equation (6):

$$OFx=(S1x+S2x)/2 \quad (6)$$

where S1x is an output of the X-axis magnetic sensor 31 when the direction of the portable phone 10 is set to an optional direction θ, and S2x is an output of the X-axis magnetic sensor 31 when the direction of the portable phone 10 is rotated by 180° (i.e., at a direction θ+180°).

Similarly, the offset amount OFy of the Y-axis magnetic sensor 32 can be given by the following equation (7):

$$OFy=(S1y+S2y)/2 \quad (7)$$

where S1y is an output of the Y-axis magnetic sensor 32 when the direction of the portable phone 10 is set to the optional direction θ, and S2y is an output of the Y-axis magnetic sensor 32 when the direction of the portable phone 10 is rotated by 180° (i.e., at the direction θ+180°).

These offset amounts OFx and OFy are proportional to the temperature of the permanent magnets. The offset amount OFx of the X-axis magnetic sensor 31 at a temperature T is given by the following equation (8):

$$OFx=(OF2x-OF1x)\cdot(T-T1)/(T2-T1)+OF1x \quad (8)$$

where OF1x is the offset amount of the X-axis magnetic sensor 31 at a temperature T1 and OF2x is the offset amount of the X-axis magnetic sensor 31 at a temperature T2 different from T1.

Similarly, the offset amount OFy of the Y-axis magnetic sensor 32 at the temperature T is given by the following equation (9):

$$OFy=(OF2y-OF1y)\cdot(T-T1)/(T2-T1)+OF1y \quad (9)$$

where OF1y is the offset amount of the Y-axis magnetic sensor 32 at the temperature T1 and OF2y is the offset amount of the Y-axis magnetic sensor 32 at the temperature T2.

In this embodiment, after the offset amounts OFx and OFy are calculated, the offset amounts OFx and OFy are subtracted from the actual sensor outputs Sx and Sy to obtain the corrected sensor outputs Sx and Sy. The direction a is determined in accordance with the corrected sensor outputs Sx and Sy and each of the direction calculation methods classified into the four cases (1) to (4). In this manner, the direction a can be determined at a high precision without the influence of the leak magnetic field of the permanent magnets. The principle of the direction determining method by the portable phone 10 has been described above.

Next, the operation of the direction determining method by CPU 21 of the portable phone 10 in accordance with the above-described principle will be described with reference to FIGS. 20 to 23. FIGS. 20 to 23 are flow charts illustrating the programs (routines) to be executed by CPU 21 each time a predetermined time lapses.

Figure 20:
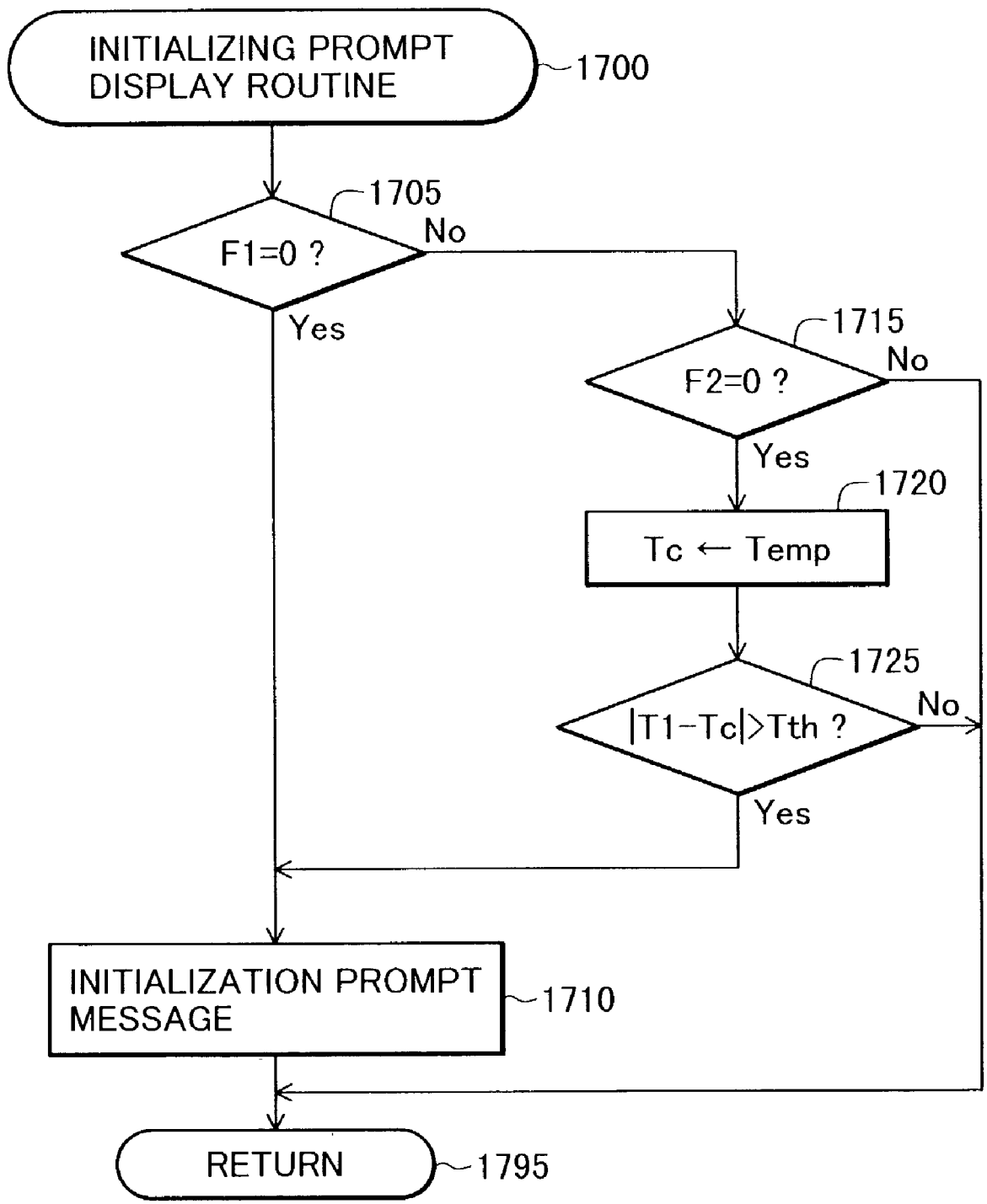
FIGS. 20 to 23 are flow charts illustrating routines to be executed by CPU shown in FIG. 2.

When a user purchased the portable phone 10 uses it at the first time and turns the power on, CPU 21 starts at a predetermined timing an initializing prompt display routine (accomplishing the function of an initialization prompting device) shown in FIG. 20 at Step 1700. Next, at Step 1705 it is checked whether a first initialization flag Fl is "0". The value of the first initialization flag Fl was set to "0" by an initialization routine which was performed immediately after the manufacture of the portable phone 10. Therefore, CPU 21 judges "Yes" at Step 1705 to advance to Step 1710 whereat a message (initializing prompt message) for prompting the user of the portable phone 10 to perform an initialization operation is displayed on the liquid crystal display panel 14a. Thereafter, at Step 1795 this routine is once terminated. The initialization prompt message includes a message of prompting the user to depress a specific offset data acquisition button among the plurality of push buttons 15a to change the state of the button to an "on" state.

Figure 21:
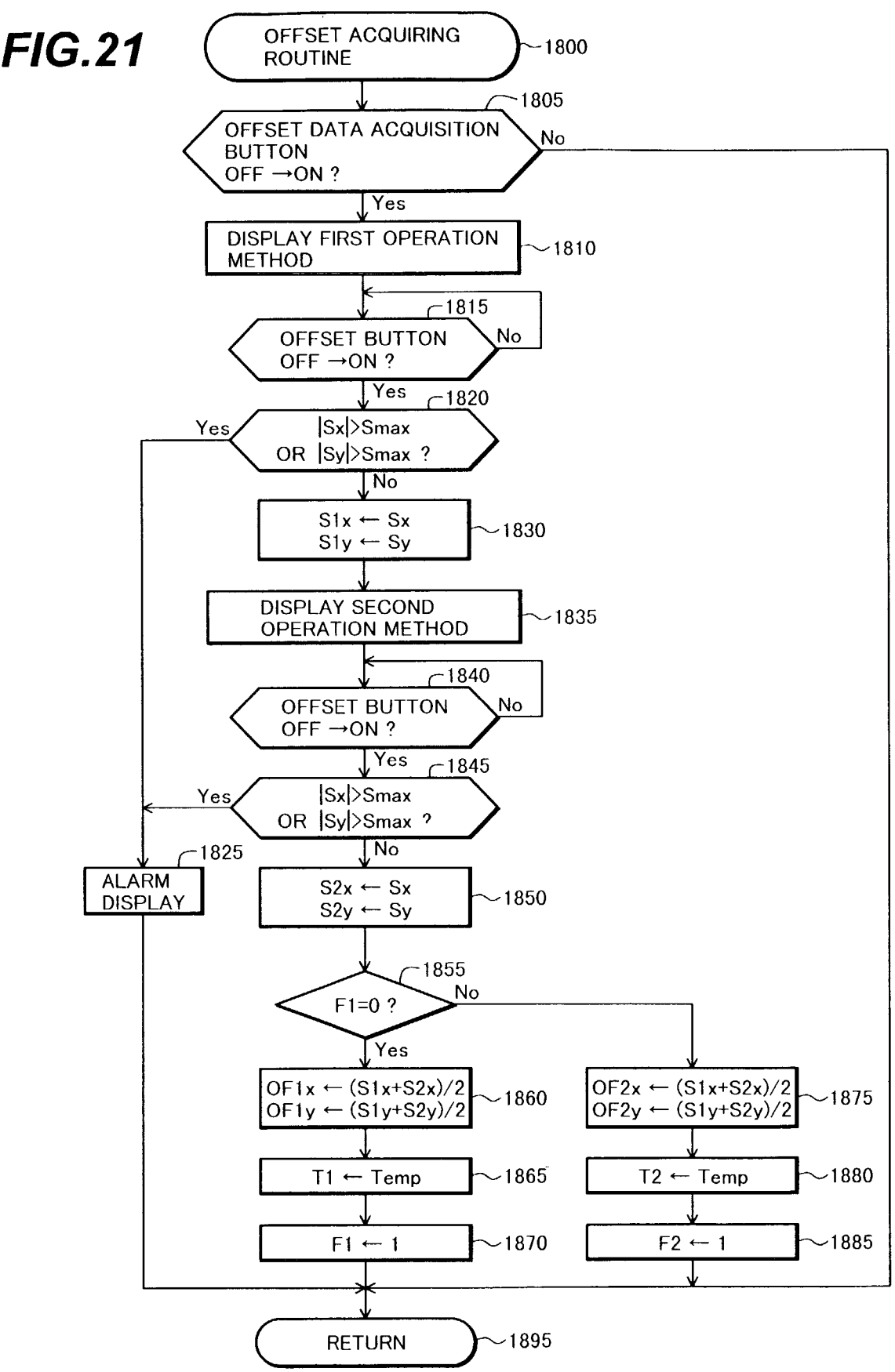

CPU 21 starts at a predetermined timing an offset data acquisition routine shown in FIG. 21 at Step 1800. Then, at Step 1805 it is checked whether the state of the offset data acquisition button changes from an "off" state to an "on" state. If not, it is judged as "No" at Step 1805 to advance to Step 1895 and repeat the above process.

When the user responds to the initialization prompt message displayed on the liquid crystal display panel 14a and the state of the offset data acquisition button is changed from the "off" state to the "on" state, CPU 21 judges as "Yes" at Step 1805 to advance to Step 1810. At Step 1810 an explanation for a "first operation method" is displayed on the liquid crystal display panel 14a. The explanation for the first operation method includes a message of prompting the user to place the portable phone 10 on a desk by turning the front side of the casing 11 upside (i.e., by setting the front side approximately horizontal) and depress a specific offset button among the plurality of push buttons 15a to thereby change the state of the button to the "on" state. Next, at Step 1815 CPU 21 monitors whether the state of the offset button changes from the "off" state to the "on" state.

When the user responds to the explanation for the first operation method and changes the state of the offset button from the "off" state to the "on" state, CPU 21 judges as "Yes" at Step 1815 to advance to Step 1820. At Step 1820 it is checked whether the absolute value of the output Sx of the X-axis magnetic sensor 31 is larger than the measurable maximum value Smax or whether the absolute value of the output Sy of the Y-axis magnetic sensor 32 is larger than the measurable maximum value Smax. If the absolute value of the output Sx of the X-axis magnetic sensor 31 is larger than the measurable maximum value Smax or if the absolute value of the output Sy of the Y-axis magnetic sensor 32 is larger than the measurable maximum value Smax, CPU 21 judges as "Yes" at Step 1820 to advance to Step 1825. At Step 1825 an alarm message to the effect that the initialization failed is displayed on the liquid crystal display panel 14*a* to advance to Step 1895 and this routine is once terminated.

If at Step 1820 the absolute value of the output Sx of the X-axis magnetic sensor 31 is equal to or smaller than the measurable maximum value Smax and if the absolute value of the output Sy of the Y-axis magnetic sensor 32 is equal to or smaller than the measurable maximum value Smax, CPU 21 judges as "No" at Step 1820 to advance to Step 1830. At Step 1830 the output Sx of the X-axis magnetic sensor 31 is stored as a first X-axis sensor output S1*x* and the output Sy of the Y-axis magnetic sensor 32 is stored as a first Y-axis sensor output S1*y*.

At Step 1835, CPU 21 displays an explanation for a "second operation method" on the liquid crystal display panel 14*a*. The explanation for the second operation method includes a message of prompting the user to depress the offset button again after the portable phone 10 is rotated by 180° on the desk with the front side thereof being turned upside and change the state of the button to the "on" state. At Step 1840 CPU 21 monitors again whether the state of the offset button changes from the "off" state to the "on" state.

When the user responds to the explanation for the second operation method and changes the state of the offset button from the "off" sate to the "on" state after rotating the portable phone 10 by 180°, CPU 21 judges as "Yes" at Step 1840 to advance to Step 1845. At Step 1845 it is checked whether the absolute value of the output Sx of the X-axis magnetic sensor 31 is larger than the measurable maximum value Smax or whether the absolute value of the output Sy of the Y-axis magnetic sensor 32 is larger than the measurable maximum value Smax. If the absolute value of the output Sx of the X-axis magnetic sensor 31 is larger than the measurable maximum value Smax or if the absolute value of the output Sy of the Y-axis magnetic sensor 32 is larger than the measurable maximum value Smax, CPU 21 judges as "Yes" at Step 1845 to advance to Step 1825. At Step 1825 an alarm message to the effect that the initialization failed is displayed to advance to Step 1895 and this routine is once terminated.

If at Step 1845 the absolute value of the output Sx of the X-axis magnetic sensor 31 is equal to or smaller than the measurable maximum value Smax and if the absolute value of the output Sy of the Y-axis magnetic sensor 32 is equal to or smaller than the measurable maximum value Smax, CPU 21 judges as "No" at Step 1845 to advance to Step 1850. At Step 1850 the output Sx of the X-axis magnetic sensor 31 is stored as a second X-axis sensor output S2*x* and the output Sy of the Y-axis magnetic sensor 32 is stored as a second Y-axis sensor output S2*y*.

Next, at Step 1855 CPU 21 checks whether the value of the first initialization flag F1 is "0". In this case, since the value of the first initialization flag F1 remains "0", CPU 21 judges as "Yes" at Step 1855 to advance to Step 1860. At Step 1860 the first X-axis offset amount OF1*x* of the X-axis magnetic sensor 31 and the first Y-axis offset amount OF1*y* of the Y-axis magnetic sensor 32 are calculated. More specifically, a sum of the first X-axis sensor output S1*x* and second X-axis sensor output S2*x* is divided by 2 (i.e., an average value is calculated) and the obtained value is used as the first X-axis offset amount OF1*x*. A sum of the first Y-axis sensor output S1*y* and second Y-axis sensor output S2*y* is divided by 2 and the obtained value is used as the first Y-axis offset amount OF1*y*. The first X-axis offset amount OF1*x* and first Y-axis offset amount OF1*y* are stored in the nonvolatile RAM 24.

At Step 1865 CPU 21 reads the temperature Temp of the temperature sensor 33 and stores it in the nonvolatile RAM 24 as the first temperature T1. At Step 1870 the value of the first initialization flag F1 is set to "1" to advance to Step 1895 whereat this routine is once terminated.

In this state, as CPU 21 starts the initializing prompt display routine shown in FIG. 20 at Step 1700 and advances to Step 1705, since the value of the first initialization flag F1 was set to "1", CPU 21 judges as "No" to advance to Step 1715 whereat it is checked whether the value of a second initialization flag F2 is "0". The value of the second initialization flag F2 was also set to "0" by the initialization routine described earlier. Therefore, CPU 21 judges as "Yes" at Step 1715 to advance to Step 1720 whereat the temperature Temp of the temperature sensor 33 is read and stored as a present temperature Tc. It is checked at Step 1725 whether the absolute value of a difference between the first temperature T1 and the present temperature Tc is larger than a predetermined temperature (threshold temperature) Tth. It is necessary to measure the temperature and geomagnetism at two temperatures having some difference in order to ensure the measurement precision of the temperature and geomagnetism amplitude with the temperature sensor and magnetic sensors. If a temperature difference is too small, it is difficult to obtain a correct temperature coefficient and make a proper correction. However, the smaller the threshold temperature Tth ($\geq 0°$ C.) is, the direction measurement becomes more precise. In addition, a smaller threshold temperature Tth is preferable in the case that the sensors and external magnetic field change abruptly with the temperature. From these reasons, it is preferable that the threshold temperature Tth is selected from the range of 5–25° C. The threshold temperature Tth is preferably set by considering the above-described conditions. For example, Tth is 10° C.

Since the present time is immediately after the first temperature T1 was acquired, the absolute value of a difference between the first temperature T1 and present temperature Tc is smaller than the threshold temperature Tth. Therefore, CPU 21 judges as "No" at Step 1725 to advance to Step 1795 whereat this routine is once terminated.

These processes are repeated until the absolute value of a difference between the first temperature T1 and present temperature Tc becomes larger than the threshold temperature Tth. The initialization prompt message will not be displayed again until such time.

Figure 22:
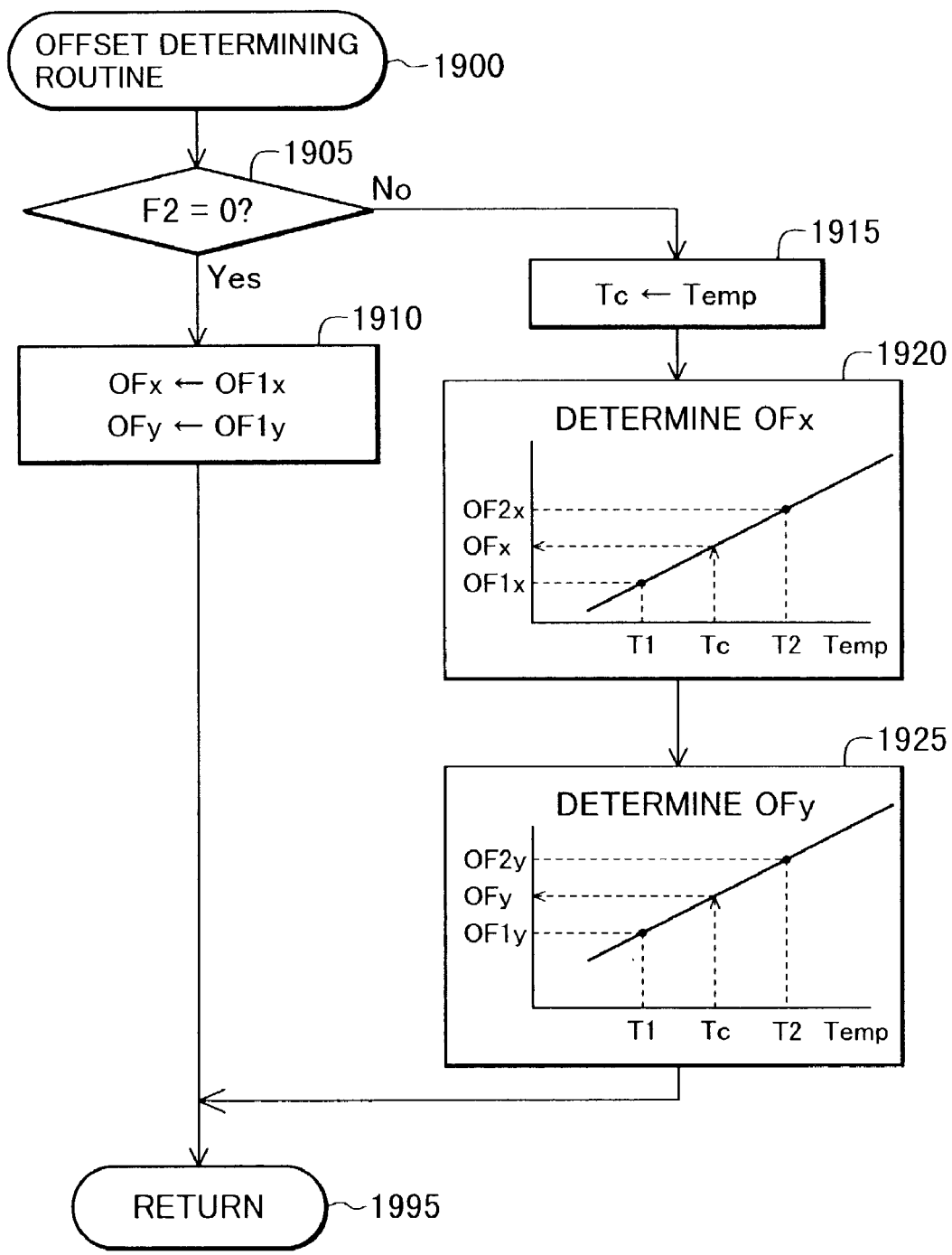

CPU 21 starts at a predetermined timing an offset determining routine shown in FIG. 22 at Step 1900. It is checked at Step 1905 whether the value of the second initialization flag F2 is "0". In this case, since the value of the second initialization flag F2 is maintained "0", CPU 21 judges as "Yes" at Step 1905 to advance to Step 1910. At Step 1910 the first X-axis offset amount OF1x and first Y-axis offset amount OF1y calculated already are set as the offset amount OFx of the X-axis magnetic sensor 31 and the offset amount OFy of the Y-axis magnetic sensor 32. Thereafter, this routine is once terminated at Step 1995.

Figure 23:
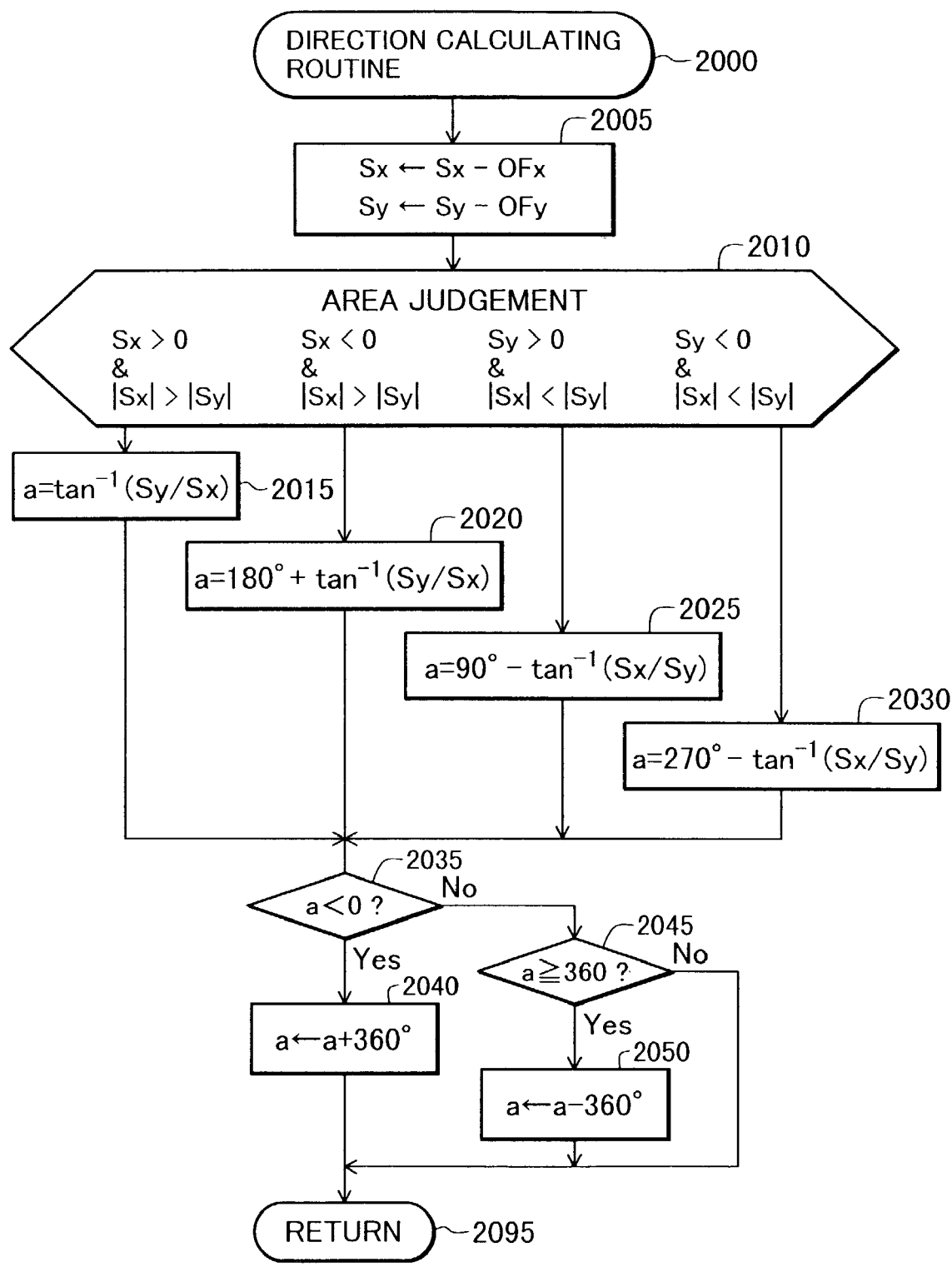

CPU 21 starts a direction calculating routine (constituting a direction determining device) shown in FIG. 23 at Step 2000. At Step 2005, the output Sx of the X-axis magnetic sensor 31 subtracted by the offset amount OFx of the X-axis magnetic sensor 31 is set as the corrected output Sx of the X-axis magnetic sensor 31, and the output Sy of the Y-axis magnetic sensor 32 subtracted by the offset amount OFy of the Y-axis magnetic sensor 32 is set as the corrected output Sy of the Y-axis magnetic sensor 32. CPU 21 judges at Step 2010 which one of the cases (1) to (4) is to be adopted. In accordance with the judgement result, the flow advances one of Steps 2015 to 2030 whereat the direction a is calculated by using the equation shown in each Step. Next, CPU 21 determines the final direction in the following manner. Namely, if the calculated direction a is negative at Step 2035, the direction a added with 360° is used as the final direction a at Step 2040, whereas if the calculated direction a is equal to or larger than 360° at Steps 2035 and 2045, the direction a subtracted by 360° is used as the final direction a at Step 2050. Thereafter, this routine is once terminated at Step 2095.

Next, the description will be given for the case that the temperature of the permanent magnets in the portable phone 10 rises and the absolute value of a difference between the first temperature T1 and present temperature Tc becomes larger than the threshold value Tth (takes the second temperature T2). In this case, at Step 1725 after Steps 1700, 1705, 1715 and 1720, CPU judges as "Yes" to advance to Step 1710 whereat the initialization prompt message is again displayed on the liquid crystal panel 14a.

When the user responds to this and depresses the offset data acquisition button to change the state to the "on" state, CPU 21 judges as "Yes" at Step 1805 shown in FIG. 21 to advance to Step 1810 and following Steps. At Step 1830 the output Sx of the X-axis magnetic sensor 31 and the output Sy of the Y-axis magnetic sensor 32 in the state that the direction of the portable phone 10 takes an arbitrary direction θ are stored as the first X-axis sensor output S1x and first Y-axis sensor output S1y, respectively. At Step 1850 the output Sx of the X-axis magnetic sensor 31 and the output Sy of the Y-axis magnetic sensor 32 in the state that the direction of the portable phone 10 takes a direction θ+180° are stored as the second X-axis sensor output S2x and second Y-axis sensor output S2y, to thereafter advance to Step 1855.

Since the value of the first initialization flag F1 was set to "1" at Step 1870, CPU 21 judges as "No" at Step 1855 to advance to Step 1875. At Step 1875 the second X-axis offset amount OF2x of the X-axis magnetic sensor 31 and the second Y-axis offset amount OF2y of the Y-axis magnetic sensor 32 are calculated. Specifically, an average value of the first X-axis sensor output S1x and the second X-axis sensor output S2x is used as the second X-axis offset amount OF2x, and an average value of the first Y-axis sensor output S1y and the second Y-axis sensor output S2y is used as the second Y-axis offset amount OF2y. The second X-axis offset amount OF2x and second Y-axis offset amount OF2y are stored in the nonvolatile RAM 24.

Next, at Step 1880 CPU 21 reads the temperature Temp of the temperature sensor 33 and stores it in the nonvolatile RAM 24 as the second temperature T2. After the value of the second initialization flag F2 is set to "1" at Step 1885, this routine is once terminated at Step 1895.

In this state, as CPU 21 starts the initializing prompt display routine shown in FIG. 20 at Step 1700, since the values of the first and second initialization flags F1 and F2 were both set to "1", CPU 21 judges as "No" at both Steps 1705 and 1715 to advance to Step 1795 whereat this routine is once terminated. The initialization prompt message will not be displayed thereafter.

In this state, as the offset determining routine shown in FIG. 22 starts, since the value of the second initialization flag F2 was changed to "1", CPU 21 judges as "No" at Step 1905 to advance to Step 1915 whereat the temperature Temp of the temperature sensor 33 is read and stored as the present temperature Tc.

Next, at Step 1920 CPU 21 linearly interpolates relative to the temperature the first X-axis offset amount OF1x at the first temperature T1 and the second X-axis offset amount OF2x at the second temperature T2 in accordance with the above-described equation (8) to thereby obtain the X-axis offset amount OFx at the present temperature Tc. Similarly, at Step 1925 CPU 21 linearly interpolates relative to the temperature the first Y-axis offset amount OF1y at the first temperature T1 and the second Y-axis offset amount OF2y at the second temperature T2 in accordance with the above-described equation (9) to thereby obtain the Y-axis offset amount OFy at the present temperature Tc. This routine is once terminated at Step 1995. In the above manner, the offset values OFx and OFy represent the influence of the magnetic field of the permanent magnets upon the magnetic sensor outputs estimated from the temperature of the permanent magnets.

In the following processes, CPU 21 executes the direction calculating routine shown in FIG. 23 so that at Step 2005 the output Sx of the X-axis magnetic sensor 31 is corrected by the offset amount OFx and the output Sy of the Y-axis magnetic sensor 32 is corrected by the offset amount OFy. Step 2005 constitutes a portion of correcting device. At Step 2010 and following Steps, the direction a is calculated (measured and determined) from the outputs Sx and Sy of the X- and Y-axis magnetic sensors 31 and 32.

As described above, in the portable phone 10 according to the embodiment of the invention, the influence of the magnetic field of the permanent magnets used as the components of the portable phone 10 upon the magnetic sensor outputs is estimated as the offset amounts OFx and OFy from the temperature of the permanent magnets. The magnetic sensor outputs are corrected by using the estimated offset amounts OFx and OFy. The direction is measured from the corrected magnetic sensor outputs so that the measurement precision of the direction can be improved considerably. Since a user is prompted to perform the initialization operations at proper timings (when the temperature takes the first temperature T1 and second temperature T2), the user is prevented from performing unnecessary initialization operations. The difference between the first temperature T1 and second temperature T2 is larger than the threshold temperature Tth. Therefore, the influence of an estimation error contained in the offset amount obtained at each temperature is hard to appear in the offset amount at the present temperature Tc obtained through linear interpolation or extrapolation or the like of the offset amounts. The measurement precision of a direction can be improved further. The magnetic sensor unit 30 has the X- and Y-axis magnetic sensors 31 and 32, temperature sensor 33 and control circuit 34 formed on a single substrate. This magnetic sensor unit 30 is therefore compact and inexpensive and suitable for portable electronic apparatuses having permanent magnets such as portable phones.

The invention is not limited only to the above embodiment, but various modifications are possible without departing from the scope of the invention. For example, in the above embodiment, although the X- and Y-axis magnetic sensors 31 and 32 are magnetic tunneling effect element groups, other magnetic sensors capable of outputting a signal corresponding to a magnetic field such as giant magnetoresistive effect elements may also be used. In the embodiment, the offset button and offset data acquisition button are used for the initialization operation. Instead, the same functions of these buttons may be realized by adding menus in the liquid crystal display panel 14a and selecting each menu by a specific operator of the operation unit 15. In addition to the X-axis magnetic sensor 31 and Y-axis magnetic sensor 32, a Z-axis magnetic sensor may be used which detects the magnetic field along the Z-axis perpendicular to the X- and Y-axes.

Figure 24:
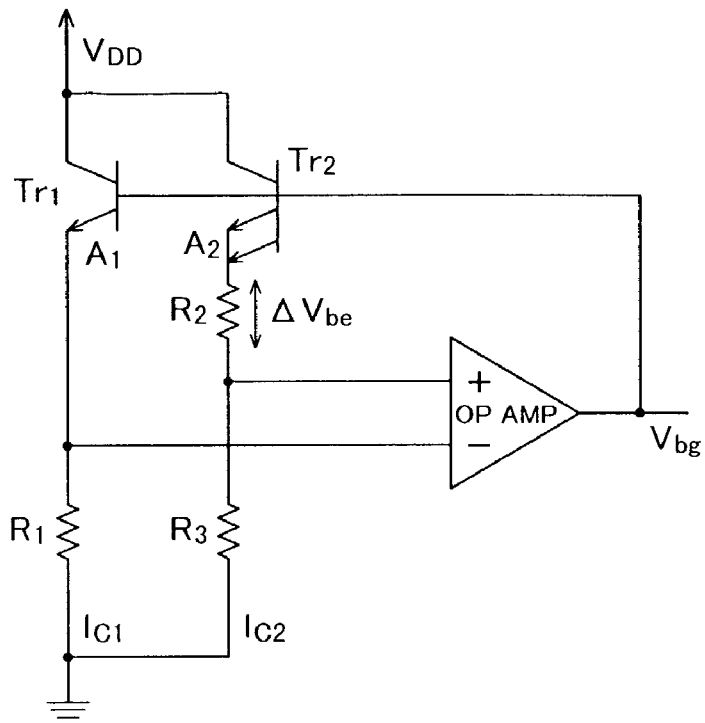
FIG. 24 is a circuit diagram showing another example of the temperature sensor.

The band gap reference circuit as the temperature sensor 33 may have the structure shown in FIG. 24. A difference $\Delta Vbe$ of the base-emitter voltages Vbe of transistors Tr1 and Tr2 is given by the following equation (10) and the output Vbg is given by the following equation (11) using Vbe and $V_T$ multiplied by a constant K1. The constant K1 is given by the following equation (12).

$$\Delta Vbe = V_T \ln\{(Ic1/Ic2)\cdot(A2/A1)\} \quad (10)$$

$$Vbg = Vbe(Q1) + K1 \cdot V_T \quad (11)$$

$$K1 = (R3/R2) \cdot \ln\{(Ic1/Ic2)\cdot(A2/A1)\} \quad (12)$$

where $V_T = KT/q$, A1 and A2 are emitter areas of the transistors Tr1 and Tr2, and Vbe(Q1) is a base-emitter voltage of the transistor Tr1.

The constant K1 is properly selected to eliminate the temperature dependency of Vbg. A voltage across a resistor R3 is supplied to an A/D converter 34a as an output of the temperature sensor 33.

Figure 25:
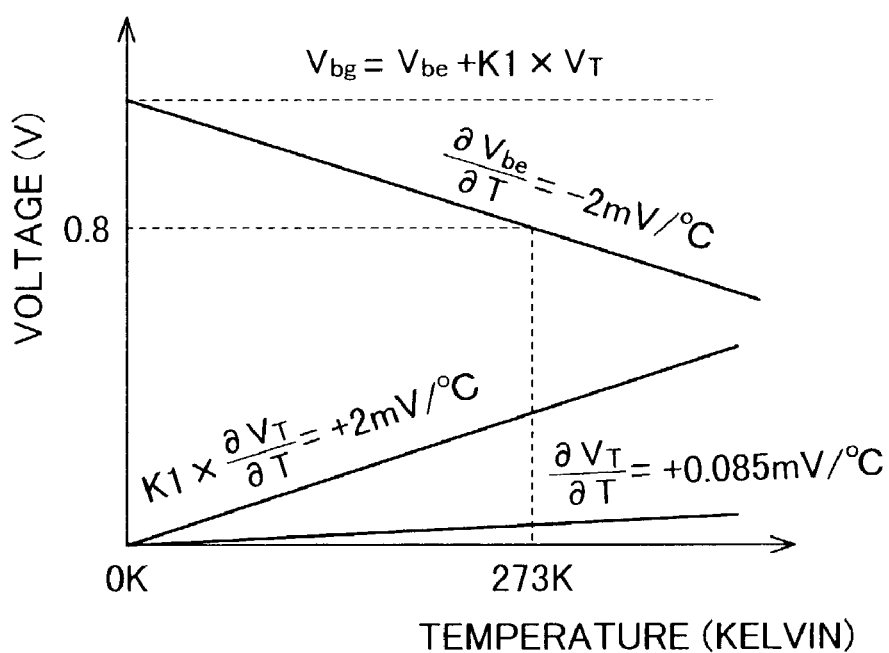
FIG. 25 is a graph showing the temperature characteristics of the circuit shown in FIG. 24.

FIG. 25 is a graph showing the temperature characteristics of the circuit shown in FIG. 24. As will be understood from FIG. 25, the circuit arrangement shown in FIG. 24 can realize the temperature sensor 33 having the temperature characteristics of 2 mV/° C.

The present invention has been described in connection with the preferred embodiment. The invention is not limited only to the above embodiment. It is apparent that various modifications, improvements, combinations, and the like can be made by those skilled in the art.

What I claim are:

1. A portable electronic apparatus comprising:

a casing;

a communication device accommodated in said casing and having permanent magnets; and a direction measuring device accommodated in said casing for measuring a direction by utilizing geomagnetism, wherein said direction measuring device comprises:

magnetic sensors for outputting signals corresponding to an external magnetic field, a temperature sensor for detecting a temperature, a corrector for estimating influence of the magnetic field of the permanent magnets upon the signals output from said magnetic sensors in accordance with the detected temperature, and correcting the signals output from said magnetic sensors in accordance with the estimated influence, and a direction determining device for determining a direction in accordance with the corrected signals, wherein said corrector measures at a first temperature the influence of the magnetic field of the permanent magnets contained in the signals output from said magnetic sensors, measures at a second temperature different from the first temperature the influence of the magnetic field of the permanent magnets contained in the signals output from said magnetic sensors, and estimates the influence of the magnetic field of the permanent magnets from the influence at the first temperature, the influence at the second temperature, and the present temperature detected with said temperature sensor; and wherein said corrector includes an initialization prompting device for prompting a user of the portable electronic apparatus to perform an operation of acquiring the influence at the second temperature when a difference between the first temperature and a temperature detected with said temperature sensor after measuring the influence at the first temperature becomes a predetermined temperature or higher.

2. A portable electronic apparatus according to claim 1, wherein said predetermined temperature is selected from the range of 5–25° C.

3. A portable electronic apparatus according to claim 1, wherein said initialization prompting device includes a character display device.

* * * * *